(12) United States Patent
Amin et al.

(10) Patent No.: US 11,926,556 B2
(45) Date of Patent: Mar. 12, 2024

(54) GLASS SUBSTRATE WITH A TEXTURED SURFACE WITH SURFACE FEATURES HAVING A CERTAIN RATIO OF HEIGHT-TO-WIDTH TO PROVIDE ANTI-GLARE PROPERTIES AND INCREASED RESISTANCE TO SCRATCHES

(71) Applicant: Corning Incorporated, Corning, NY (US)

(72) Inventors: Jaymin Amin, Corning, NY (US); Robert Randall Hancock, Jr., Corning, NY (US); Raymond Chih Chung Hsiao, Painted Post, NY (US); Yuhui Jin, Painted Post, NY (US); Aize Li, Painted Post, NY (US); Jared Hilliard Seaman, Corning, NY (US)

(73) Assignee: Corning Incorporated, Corning, NY (US)

( * ) Notice: Subject to any disclaimer, the term of this patent is extended or adjusted under 35 U.S.C. 154(b) by 241 days.

(21) Appl. No.: 16/843,377

(22) Filed: Apr. 8, 2020

(65) Prior Publication Data
US 2020/0325064 A1   Oct. 15, 2020

Related U.S. Application Data

(60) Provisional application No. 62/831,307, filed on Apr. 9, 2019.

(51) Int. Cl.
*C03C 15/00*    (2006.01)
*C03C 3/083*    (2006.01)
(Continued)

(52) U.S. Cl.
CPC .............. *C03C 15/00* (2013.01); *C03C 3/083* (2013.01); *C03C 3/085* (2013.01); *C03C 3/087* (2013.01);
(Continued)

(58) Field of Classification Search
CPC ......... C03C 15/00; C03C 3/083; C03C 3/085; C03C 3/087; C03C 3/091; C03C 23/0075; C03C 23/0085
See application file for complete search history.

(56) References Cited

U.S. PATENT DOCUMENTS 6,958,860 B2   10/2005   Dontula et al.
7,195,872 B2    3/2007   Agrawal et al.
(Continued)

FOREIGN PATENT DOCUMENTS

CN   102548922 A    7/2012
CN   106250800 A   12/2016
(Continued)

OTHER PUBLICATIONS

Feng, Biao "Effects of surface roughness on scratch resistance and stress-strain fields during scratch tests" AIP Advances 7, 035217 (2017); https://doi.org/10.1063/1.4979332 (Year: 2017).*
(Continued)

*Primary Examiner* — Alicia J Weydemeyer
*Assistant Examiner* — Laura B Figg
(74) *Attorney, Agent, or Firm* — William J. Tucker

(57) ABSTRACT

A glass substrate comprises: a first surface with surface features having an average width, an average height, a ratio of the average height to the average width of from about 0.04 to about 0.24, and the first surface has a haze value of 3% to 40%. The glass substrate can be transparent to electromagnetic radiation in the visible spectrum. The glass substrate can have a composition of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO. The first surface can have an average surface roughness Ra of from 10 nm to 1,000 nm. The first surface can have an average characteristic largest feature size of from 200 nm to
(Continued)

50 μm. The ratio of the average height to the average width can be from 0.06 to about 0.08.

23 Claims, 20 Drawing Sheets

(51) Int. Cl.
  *C03C 3/085* (2006.01)
  *C03C 3/087* (2006.01)
  *C03C 3/091* (2006.01)
  *C03C 23/00* (2006.01)
(52) U.S. Cl.
  CPC .......... *C03C 3/091* (2013.01); *C03C 23/0075* (2013.01); *C03C 23/0085* (2013.01)

(56) References Cited

U.S. PATENT DOCUMENTS

| | | |
|---|---|---|
| 2006/0228092 A1 | 10/2006 | Hebrink et al. |
| 2010/0033818 A1 | 2/2010 | Petcavich et al. |
| 2011/0062849 A1 | 3/2011 | Carlson et al. |
| 2018/0282201 A1* | 10/2018 | Hancock, Jr. ........... C03C 3/083 |
| 2019/0248098 A1 | 8/2019 | Ozeki et al. |
| 2020/0095160 A1 | 3/2020 | Jin et al. |
| 2022/0132690 A1 | 4/2022 | Amin et al. |

FOREIGN PATENT DOCUMENTS

| | | |
|---|---|---|
| CN | 107428594 A | 12/2017 |
| DE | 112014003338 T5 | 3/2016 |
| WO | 2014/012003 A2 | 1/2014 |
| WO | 2015/072297 A1 | 5/2015 |
| WO | 2016/118462 A2 | 7/2016 |
| WO | 2019055745 A1 | 3/2019 |

OTHER PUBLICATIONS

International Search Report and Written Opinion of the International Searching Authority; PCT/US2020/027209; dated Jul. 3, 2020; 11 Pages; European Patent Office.

Indian Patent Application No. 202117046289, First Examination Report dated Feb. 2, 2023, 8 pages Original Document; Indian Patent Office.

Chinese Patent Application No. 202080027991.6, Office Action dated Jan. 20, 2023, 5 pages (English Translation only), Chinese Patent Office.

* cited by examiner

GLASS SUBSTRATE WITH A TEXTURED SURFACE WITH SURFACE FEATURES HAVING A CERTAIN RATIO OF HEIGHT-TO-WIDTH TO PROVIDE ANTI-GLARE PROPERTIES AND INCREASED RESISTANCE TO SCRATCHES

This application claims the benefit of priority under 35 U.S.C. § 119 of U.S. Provisional Application Ser. No. 62/831,307, filed on Apr. 9, 2019, the content of which is relied upon and incorporated herein by reference in its entirety.

BACKGROUND

The present invention generally relates to textured glass substrates having anti-glare properties and increased resistance to scratches over non-textured glass substrates.

A glass substrate simultaneously acts as a protective barrier and is transparent to wavelengths of electromagnetic radiation relevant to the particular application (oftentimes visible light). As such, it is desirable for the glass substrate to resist scratches and fracturing, which would otherwise decrease the aesthetic appeal of the application and the transmissivity of the glass substrate. Therefore, the glass substrate is sometimes strengthened through various processes known in the art, such as a chemical process referred to as ion-exchange or a physical process referred to as thermal tempering, which impart a compressive stress upon the surface layer(s) of the glass substrate that resists scratches and fractures.

In addition, it is desirable for the glass substrate to reduce glare. Glare is light reflecting off a surface or surfaces of the glass substrate. The perceived glare can lessen the ability of the person to see an electronic display protected by the glass substrate. There are various processes to modify the glass substrate to reduce the perceived glare, such as "texturing" the surface(s) of the glass substrate to add surface features, which scatter reflected light and thereby reduce glare. Texturing a primary surface can additionally improve tactile experience of a glass substrate used as part of a touch-screen electronic display.

However, there is a problem in that imparting surface features to reduce glare has a tendency of rendering the primary surface more susceptible to becoming scratched. In other words, treating the primary surface of the glass substrate to add surface features that reduce glare has heretofore lessened the scratch resistance of the primary surface imparted via the strengthening process such as ion-exchange.

SUMMARY

The present disclosure solves that problem with a glass substrate that has been textured so that the surface features have an average height and an average width and the ratio of the average height to the average width is between about 0.04 and about 0.24. Surface features having a height-to-width ratio within that range not only provide anti-glare properties (acceptable levels of haze) but also increases or optimizes resistance to scratches.

According to a first aspect of the present disclosure, a glass substrate comprises: a first surface with surface features having an average width, an average height, a ratio of the average height to the average width of from about 0.04 to about 0.24, and the first surface has a haze value of 3% to 40%. In an embodiment, the glass substrate is transparent to electromagnetic radiation in the visible spectrum. In an embodiment, the glass substrate has a composition of: 61-75 mol. % $SiO_2$; 7-15 mol. % $Al2O_3$; 0-12 mol. % $B_2O_3$; 9-21 mol. % $Na_2O$; 0-4 mol. % $K_2O$; 0-7 mol. % MgO; and 0-3 mol. % CaO. In an embodiment, the first surface has an average surface roughness Ra of from 10 nm to 1,000 nm. In an embodiment, the first surface has an average characteristic largest feature size of from 200 nm to 50 μm. In an embodiment, the ratio of the average height to the average width is from about 0.06 to about 0.24. In an embodiment, the ratio of the average height to the average width is from about 0.06 to about 0.08. In an embodiment, the ratio of the average height to the average width is about 0.065. In an embodiment, the first surface has a haze value from 3.5% to 12.5%. In an embodiment, the first surface has a haze value from 3.5% to 12.5%. In an embodiment, the glass substrate further comprises a layer, contiguous with the first surface, that is under compressive stress.

According to a second aspect of the present disclosure, a method of texturing a first surface of a glass substrate comprises: placing a glass substrate having a first surface into a vessel that includes a non-HF, low pH etchant, for a time period of 80 to 120 minutes, and the first surface afterwards has a haze value from 0.1% to 40%. In an embodiment, the non-HF, low pH etchant, is citric acid. In an embodiment, the method further comprises rinsing the glass substrate in water, drying the glass substrate, and soaking the glass substrate in a solution including NaOH at above room temperature for a time period of 15 minutes to 45 minutes. In an embodiment, the first surface is textured with surface features having an average width, an average height, and a ratio of the average height to the average width of from about 0.04 to about 0.24. In an embodiment, the first surface is textured with surface features having an average width, an average height, and a ratio of the average height to the average width of from about 0.06 to about 0.08.

According to a third aspect of the present disclosure, a method of texturing a first surface of a glass substrate comprises: causing a first surface of a glass substrate to have surface features, the surface features having an average width, an average height, and a ratio of the average height to the average width of 0.24 or greater; and reducing the ratio of the average height to the average width to between 0.04 and 0.24, and the first surface has a haze value from 0.1% to 40%. In an embodiment, the step of causing the first surface of the glass substrate to have surface features includes sandblasting the first surface or placing the glass substrate into a vessel that includes a non-HF, low pH etchant, for a time period of 80 to 120 minutes. In an embodiment, the step of reducing the ratio of the average height to the average width includes soaking the glass substrate in a solution including HF, NaOH, or KOH.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
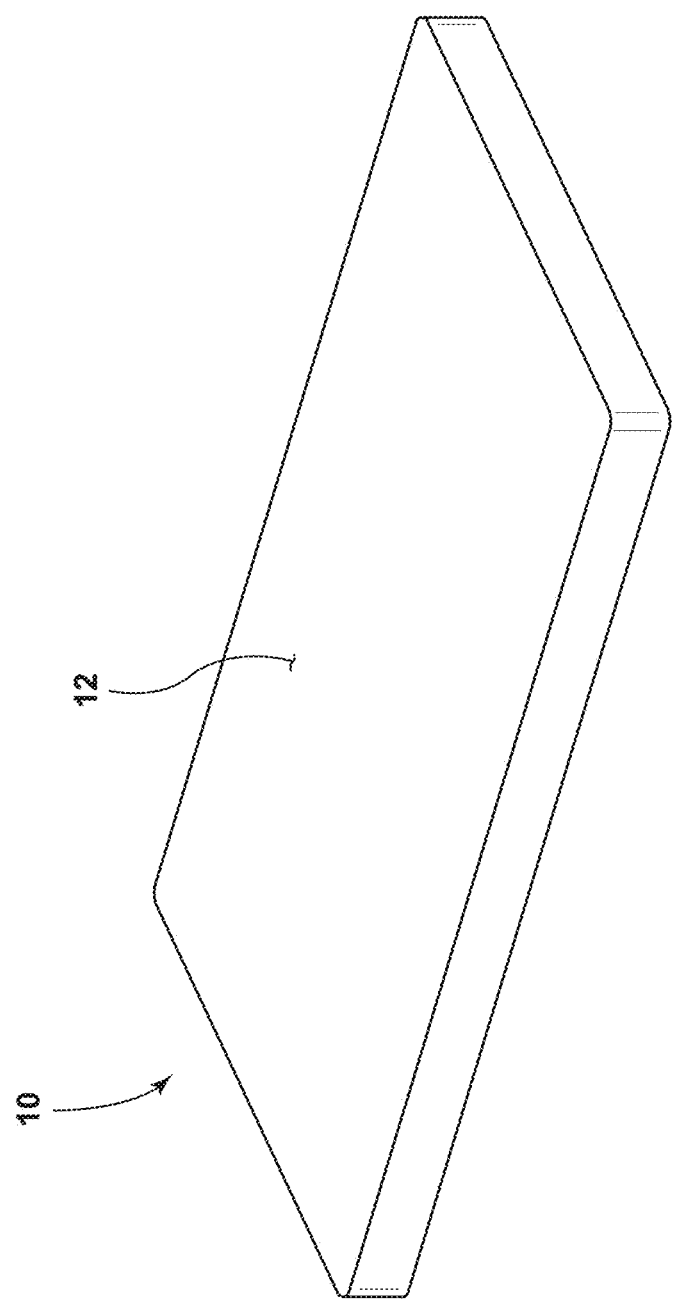
FIG. 1 is a perspective view of a glass substrate illustrating a first surface.

Reference will now be made in detail to the present preferred embodiments, examples of which are illustrated in the accompanying drawings. Whenever possible, the same reference numerals will be used throughout the drawings to refer to the same or like parts.

Figure 2:
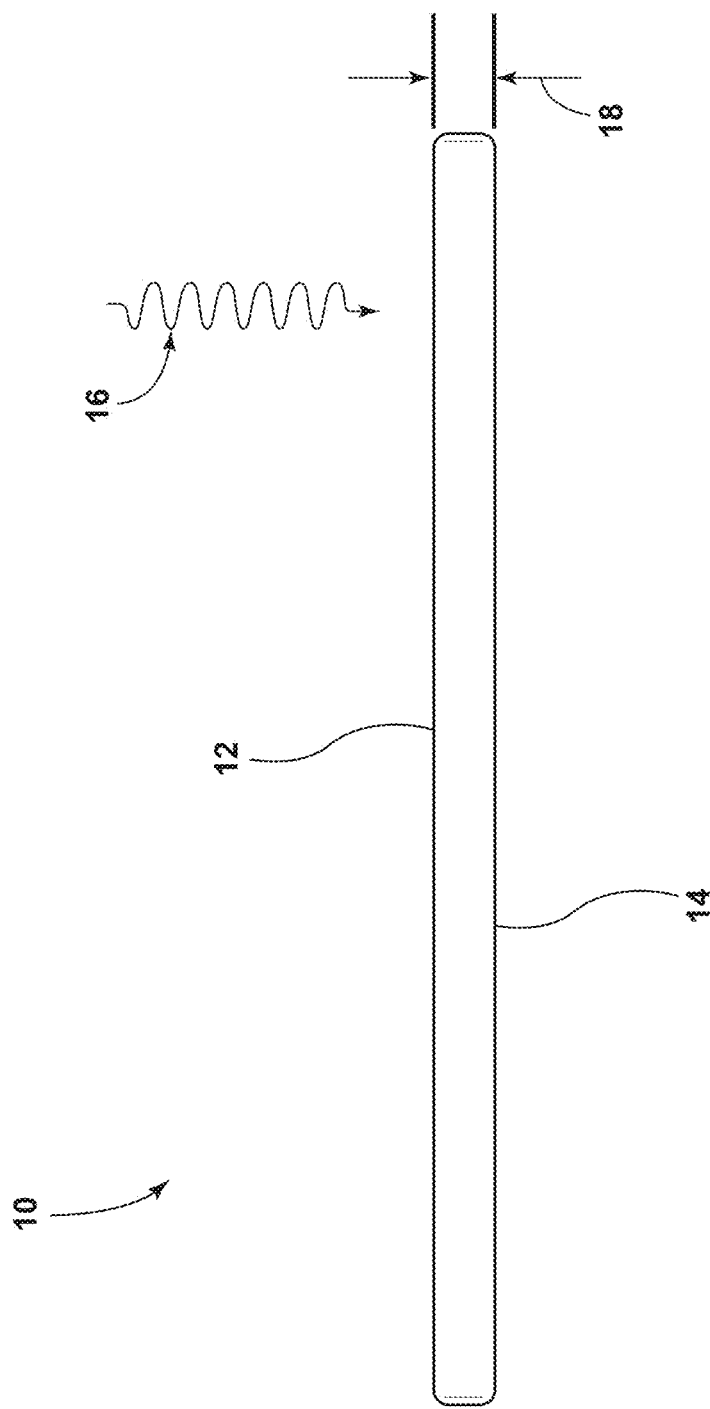
FIG. 2 is a side view of the glass substrate of FIG. 1, illustrating the glass substrate having a thickness between the first surface and a second surface.

Referring now to FIGS. 1 and 2, a glass substrate 10 is illustrated. The glass substrate 10 includes a first surface 12 and a second surface 14. The first surface 12 and the second surface 14 are the primary surfaces of the glass substrate 10 through which incident electromagnetic radiation in a visible spectrum 16 thereof (hereinafter referred to as "visible light 16") transmits and/or reflects. The first surface 12 and the second surface 14 are typically generally planar and parallel, as in the illustrated embodiment, but can be curved and/or not parallel. The glass substrate 10 is transparent, meaning that that the glass substrate 10 transmits at least 70% of visible light 16 incident to the normal of the first surface 12 through the glass substrate 10 and out of the second surface 14. In many instances, the glass substrate 10 will so transmit at least 85% of visible light 16, sometimes approaching or exceeding 90% of visible light 16. The glass substrate 10 can be a sheet that has a thickness 18 defined as a straight-line distance, normal to either the first surface 12 or second surface 14 or both, between the first surface 12 and the second surface 14.

The glass substrate 10 can have any composition that is suitable for the desired article of which the glass substrate 10 is a component. In one more embodiments, the glass substrate 10 can be borosilicate glass, aluminosilicate glass, soda-lime glass, alkali aluminosilicate glass, or alkali aluminoborosilicate glass, although other categories of glass substrates 10 are contemplated, such as those including alkaline earth oxides. One exemplary glass composition comprises at least 60 mol. % $SiO_2$, wherein the mol. % ratio ($Al_2O_3+B_2O_3$)/Σmodifiers (i.e., sum of modifiers) is greater than 1, wherein the modifiers are alkali metal oxides. One exemplary glass composition comprises $SiO_2$, $B_2O_3$, and $Na_2O$, wherein ($SiO_2+B_2O_3$)≥66 mol. %, and $Na_2O$≥9 mol. %. Example alkali aluminosilicate glass substrates have a composition of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % $MgO$; and 0-3 mol. % $CaO$. An example alkali aluminosilicate glass substrate has a composition of: 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % $MgO$; 0.58 mol % $CaO$; 0.01 mol % $ZrO_2$; 0.21 mol % $SnO_2$; and 0.007 mol % $Fe_2O_3$. An example alkali aluminoborosilicate glass substrate has a composition of 64 mol % $SiO_2$, 14.5 mol % $Al_2O_3$, 8 mol % $B_2O_3$, 11.5 mol % $Na_2O$, and 0.1 mol % $SnO_2$. Exemplary glass substrates 10 are sold under the trademark GORILLA® by Corning, Inc., and those glass substrates 10 are fusion drawn and subjected to ion-exchange strengthening process(es).

Figure 3A:
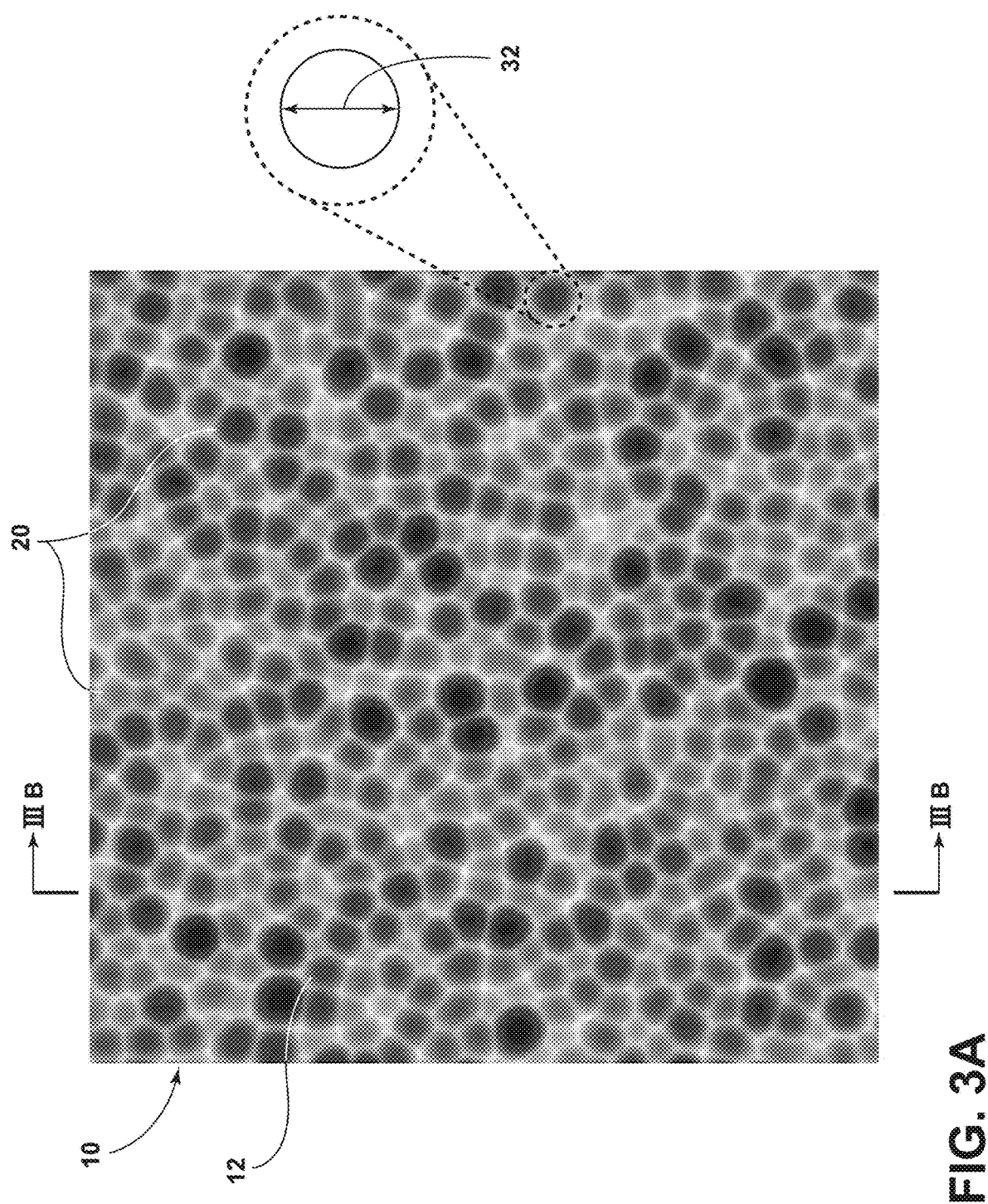
FIG. 3A is an atomic force microscopy ("AFM") image of the first surface of a glass substrate that has been textured, illustrating that the texturing has created surface features on the first surface that take a cellular matrix-like appearance.
Figure 3B:
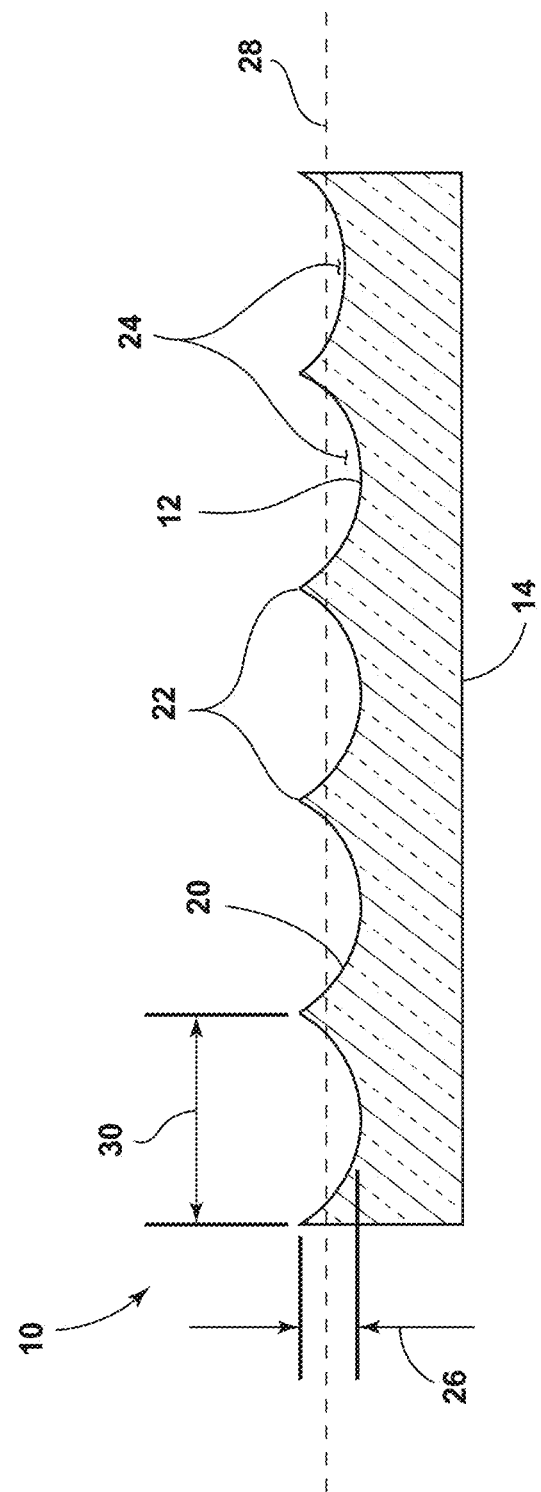
FIG. 3B is a conceptual cross-sectional side view of the glass substrate of FIG. 3A taken through line IIIB-IIIB of FIG. 3A, illustrating that each of the surface features has adjacent peaks, a valley between the adjacent peaks, a height defined as the distance between a peak and the adjacent valley, and a width defined as the distance from a peak to an adjacent peak.

Referring now to FIGS. 3A and 3B, after the glass substrate 10 is modified to impart a texture (such as to reduce glare), the glass substrate 10 has surface features 20 on the first surface 12. FIG. 3A illustrates a magnified top view looking down at the first surface 12. FIG. 3B illustrates a conceptual cross-sectional view taken through line IIIB-IIIB of FIG. 3A. Because the surface features 20 are generally approximately partial spherical or ellipsoid voids, in the illustrated embodiment, the surface features 20, when viewed at a cross-section, provide peaks 22 and valleys 24. The distance between one of the peaks 22 and one of the valleys 24 of the surface feature 20 is a height 26 of the surface feature 20. The height 26 of a surface feature 20 can be measured. The arithmetic average of the absolute values of the height deviations from a mean line 28, taken along a profile (line) (such as line IIIB-IIIB), is referred to as the "average surface roughness" and is symbolized as "Ra." Because Ra is determined based on deviation from the mean line 28 between the peaks 22 and the valleys 24 of all the surface features 20 along the line, the Ra is approximately half of the average peak to valley heights 26 of all the surface features 20 along the line. Various types of optical profilers, such as the NewView™ 7300 optical surface profiler distributed by the Zygo Corporation, can determine average surface roughness Ra for the first surface 12 of the glass substrate 10. A continuous surface area of the surface features 20 forms a "textured" first surface 12. It should be understood that the second surface 14 can be textured with surface features 20 as well.

Like the height 26 of a surface feature 20, an average width 30 of the surface features 20 can be measured. With the type of morphology of the embodiment illustrated in FIGS. 3A and 3B, where the surface features 20 appear as a cellular matrix, the width 30 of any particular surface feature 20 is the distance between one peak 22 and the adjacent peak 22 (which approximates a diameter 32 of the surface feature 20). In some instances, the width 30 of any particular surface feature 20 can be the distance between one valley 24 and the next adjacent valley 24. Because the width 30 of a surface feature 20 is measured in the plane of the first surface 12 (or the second surface 14, if the dimensions of any surface features 20 at the second surface 14 are at issue), the width 30 is independent of the height 26 of the surface feature 20 (and thus the width 30 is independent of the average surface roughness, Ra). A standard calibrated optical light microscope or AFM can typically be used to measure the width 30 of a surface feature 20. Various methods of measuring the width 30 of the surface feature 20 can be utilized. The method of average characteristic largest feature size (abbreviated "ALF") is the average x-y linear dimension of the twenty largest repeating surface features 20 within a viewing field on a first surface 12 that has been textured. The viewing field is proportional to the surface feature 20 size, and typically has an area of approximately 30(ALF)×30(ALF). If, for example, the ALF is approximately 10 μm, then the viewing field from which the twenty largest surface features 20 are selected is approximately 300 μm×300 μm. The standard deviation of the twenty largest surface features 20 that are used to determine ALF should generally be less than about 40% of the average value, i.e., major outliers should be ignored since these are not considered "characteristic" features. When the textured first surface 12 takes the appearance, as here, of a cellular matrix, the surface features 20 to be measured in the ALF determination are the largest of the cells (circular-like peaks 22) in the cellular matrix. The ALF method is preferred over other methods that determine a more global average feature size, because the human eye most easily sees the largest surface features 20 and are therefore most important in determining visual acceptance of the glass substrate 10. However, one of those other methods that determine a more global average surface feature 20 size can be utilized to determine the average width 30 of the surface features 20. The ratio of height-to-width to the surface features 20 can thus be calculated as 2 Ra/ALF.

Figure 4:
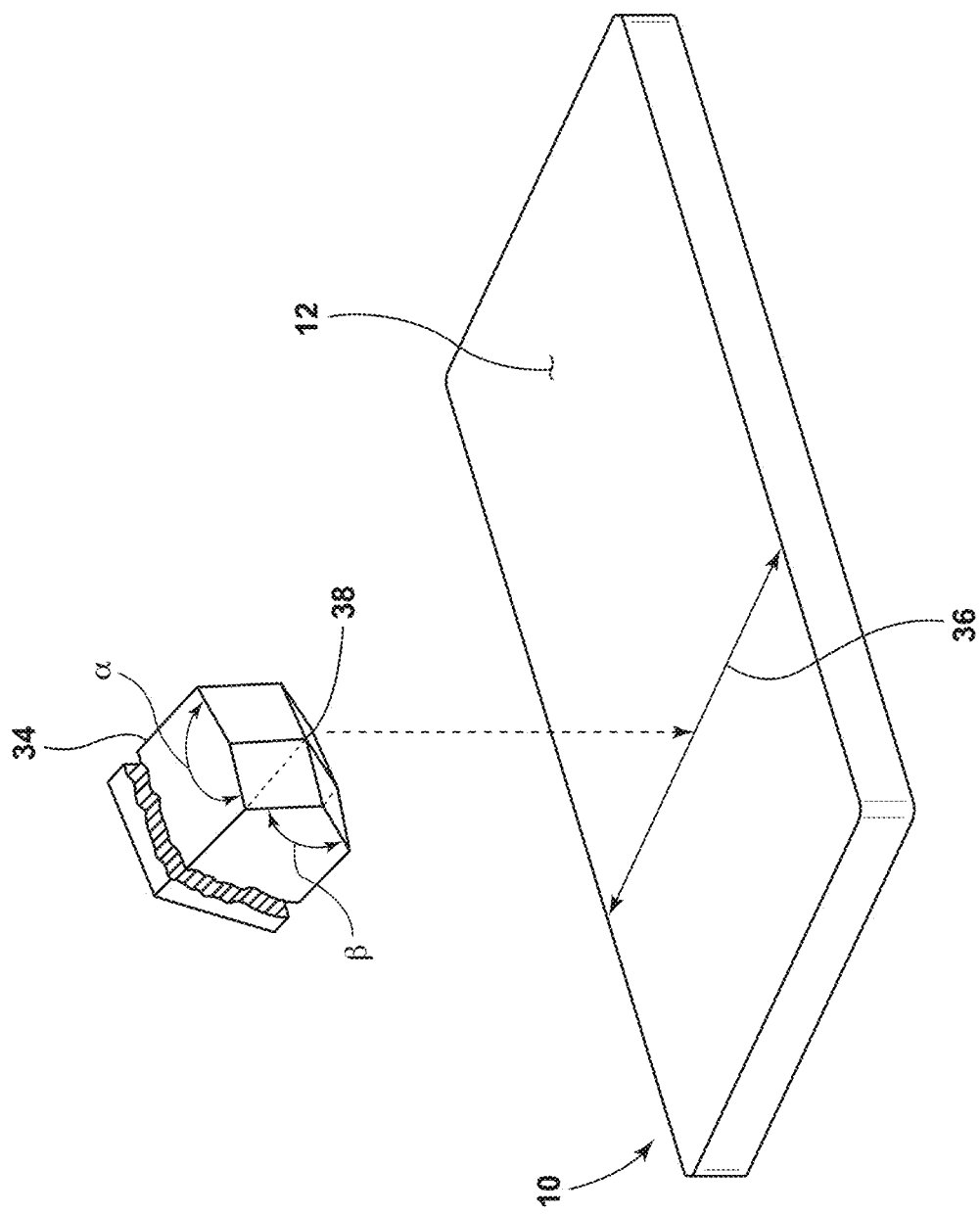
FIG. 4 is a perspective view of a glass substrate having a first surface that is soon to be scratched along a distance by a blunt object (Knoop Indenter), which has a tip with a particular geometry.

When considering the response of the first surface 12, which has been textured, to a scratch event, there are at least two general types of scratch events to consider. Referring now to FIG. 4, a first type of scratch event occurs when a blunt object 34 contacts the first surface 12 of the glass substrate 10 with a relatively large, yet constant, force through a distance 36 along the first surface 12. The blunt object 34 has a tip 38 that contacts the first surface 12. When this type of scratch event is replicated through material testing, the blunt object 34 with the tip 38 utilized is often referred to as a "Knoop Indenter." The Knoop Indenter is utilized in a standardized (ASTM E384) microhardness test referred to as the "Knoop hardness test." The Knoop Indenter tip 38 has a particular geometry. More specifically, the shape of the tip 38 of the Knoop Indenter interacting with the first surface 12 is a pyramidal diamond terminating in a point, with an angle α of 172.5° and an angle β of 130°.

Figure 5A:
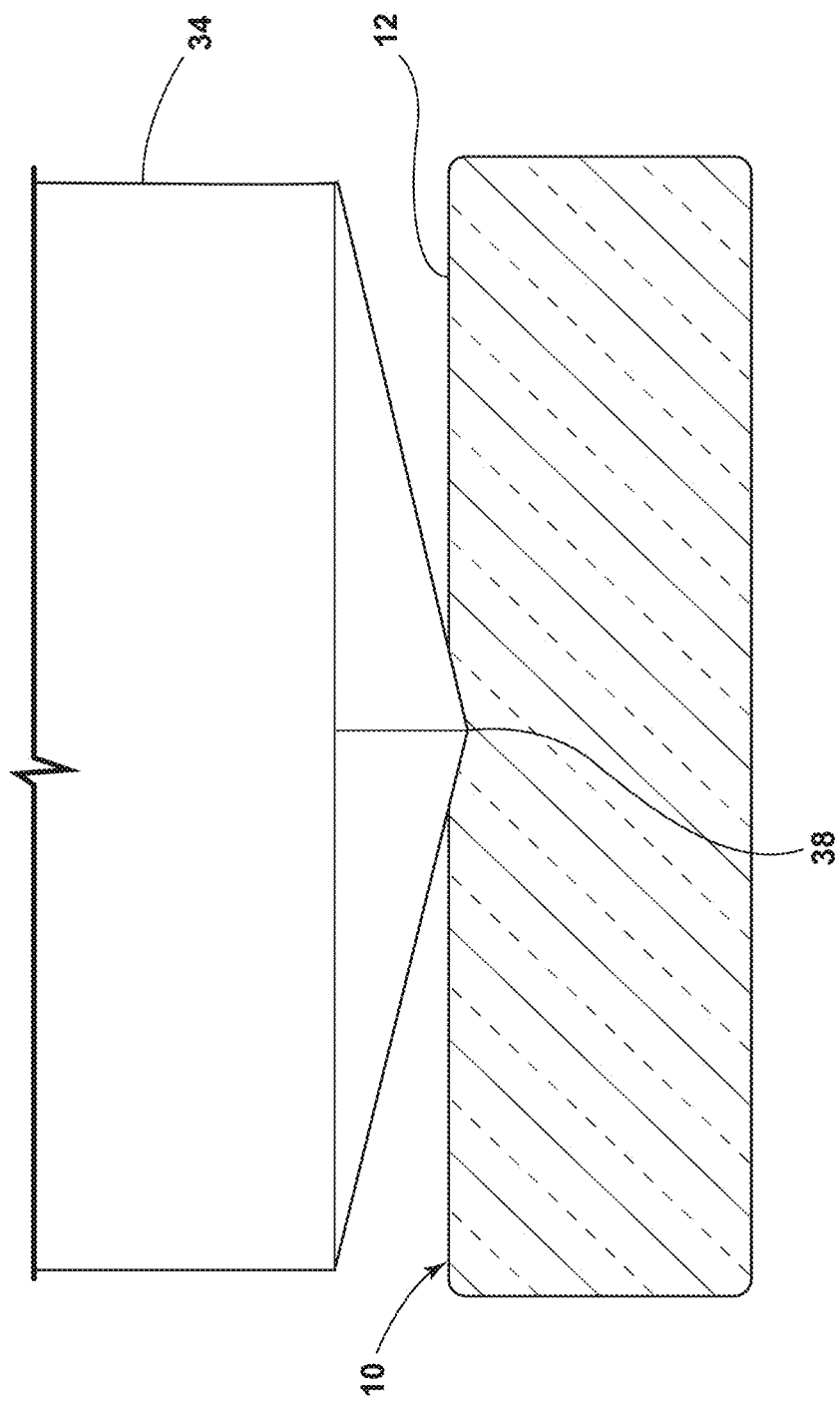
FIG. 5A is conceptual cross-sectional view of a non-textured version of the glass substrate of FIG. 4, illustrating that the tip of the blunt object is not impeded by surface features from contacting the first surface.
Figure 5B:
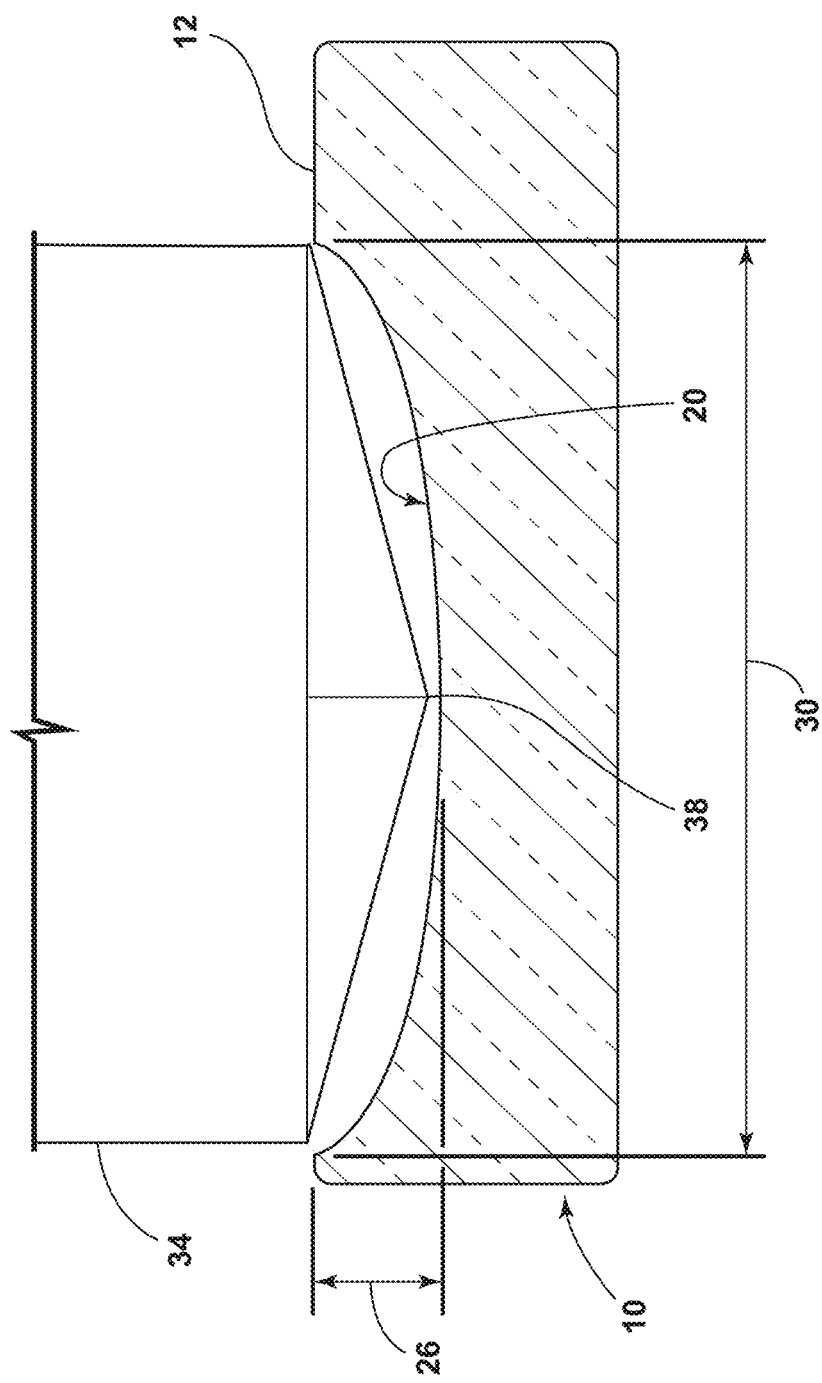
FIG. 5B is a conceptual cross-sectional view of a textured version of the glass substrate of FIG. 4, illustrating that, although the first surface has surface features resulting from texturing, the height-to-width ratio of the surface features is too small to prevent the top of the blunt object from contacting the valley of the surface feature.
Figure 5C:
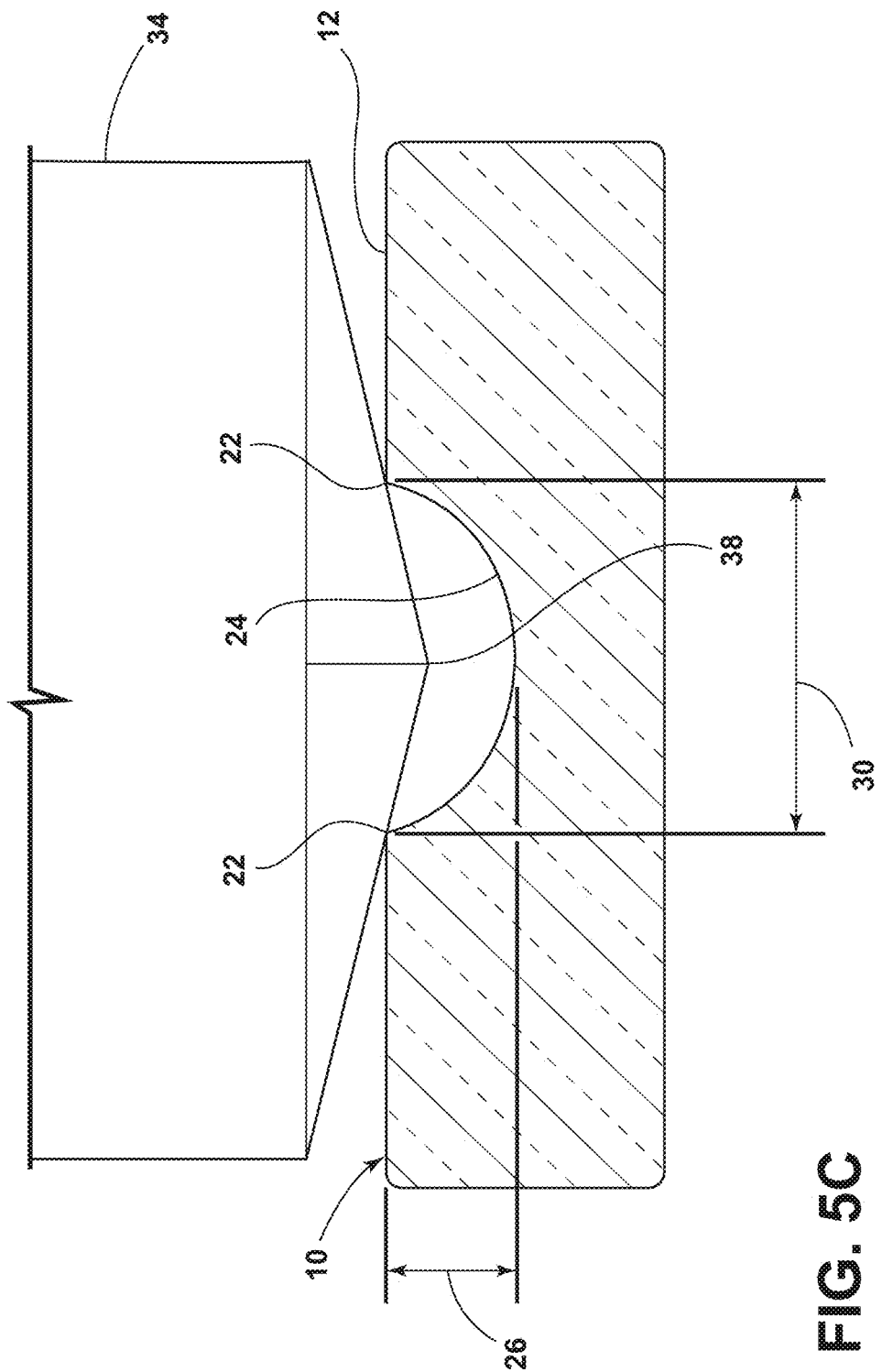
FIG. 5C is a conceptual cross-sectional view of a textured version of the glass substrate of FIG. 4, illustrating that the surface features resulting from texturing has a height-to-width ratio that is large enough to prevent the top of the blunt object from contacting the valleys of the surface features.

Referring now to FIGS. 5A-5C, those figures conceptually demonstrate that the ratio of the height 26 of a surface feature 20 to the width 30 of the surface feature 20 affects the ability of the tip 38 of the blunt object 34 (here, the Knoop Indenter) to scratch the first surface 12 of the glass substrate 10. At FIG. 5A, the first surface 12 of the glass substrate 10 has not been textured, and the tip 38 of the blunt object 34 touches the first surface 12 without hindrance (and is therefore most able to scratch the first surface 12). At FIG. 5B, the first surface 12 of the glass substrate 10 has been textured. However, the ratio of the height 26 of the surface feature 20 to the width 30 of the surface feature 20 is too small for the surface feature 20 to prevent the tip 38 of the blunt object 34 from interacting with (and therefore scratch) the first surface 12. At FIG. 5C, the first surface 12 of the glass substrate 10 has been textured. And, contrary to FIG. 5B, the ratio of the height 26 of the surface feature 20 to the width 30 of the surface feature 20 is large enough for the surface feature 20 to prevent the tip 38 of the blunt object 34 from interacting with (and therefore scratch) the first surface 12. In other words, the adjacent peaks 22 of the surface feature 20 interact with the blunt object 34 to prevent the tip 38 of the blunt object 34 from interacting with the valley 24 between the adjacent peaks 22.

Figure 6A:
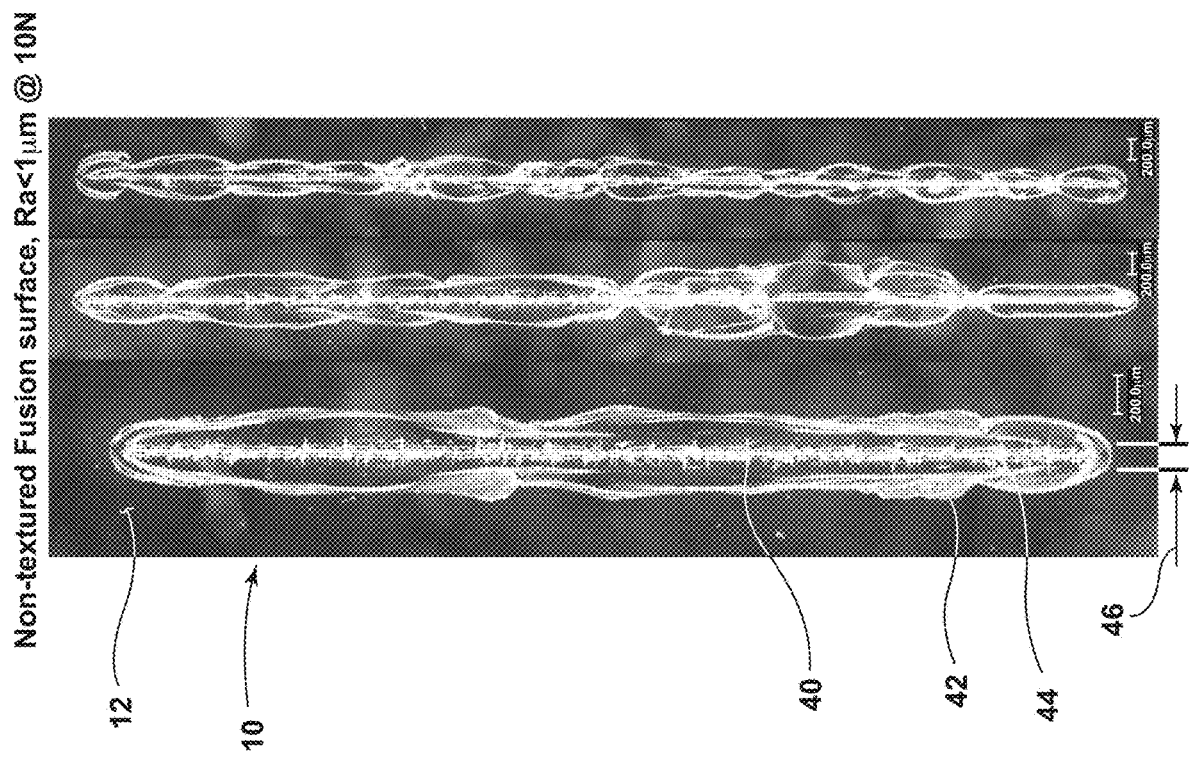
FIG. 6A is a photograph of a non-textured glass substrate after being scratched by the blunt object of FIG. 4 (Knoop Indenter), illustrating cracks and chipping outside of the main scratch track.
Figure 6B:
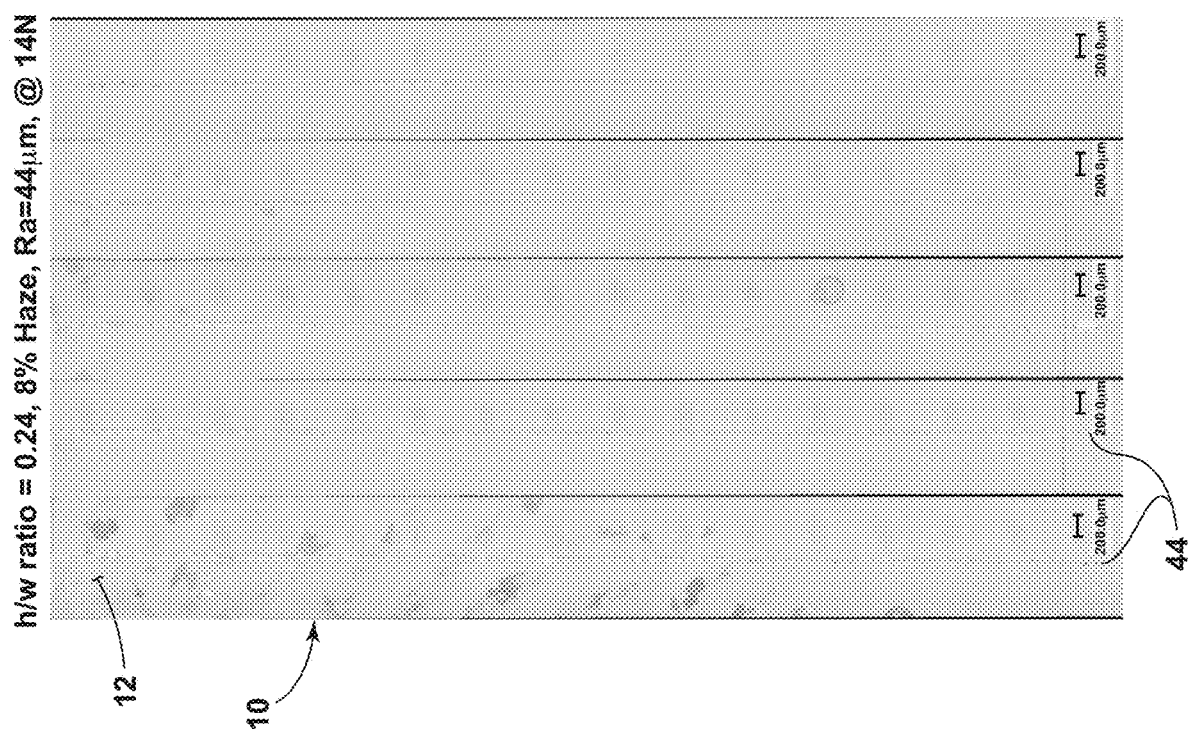
FIG. 6B is a photograph of a textured glass substrate with a haze of 8% and with surface features at the first surface having a height-to-width ratio of 0.24, illustrating a lack of cracks and chipping outside of the main scratch track.
Figure 6C:
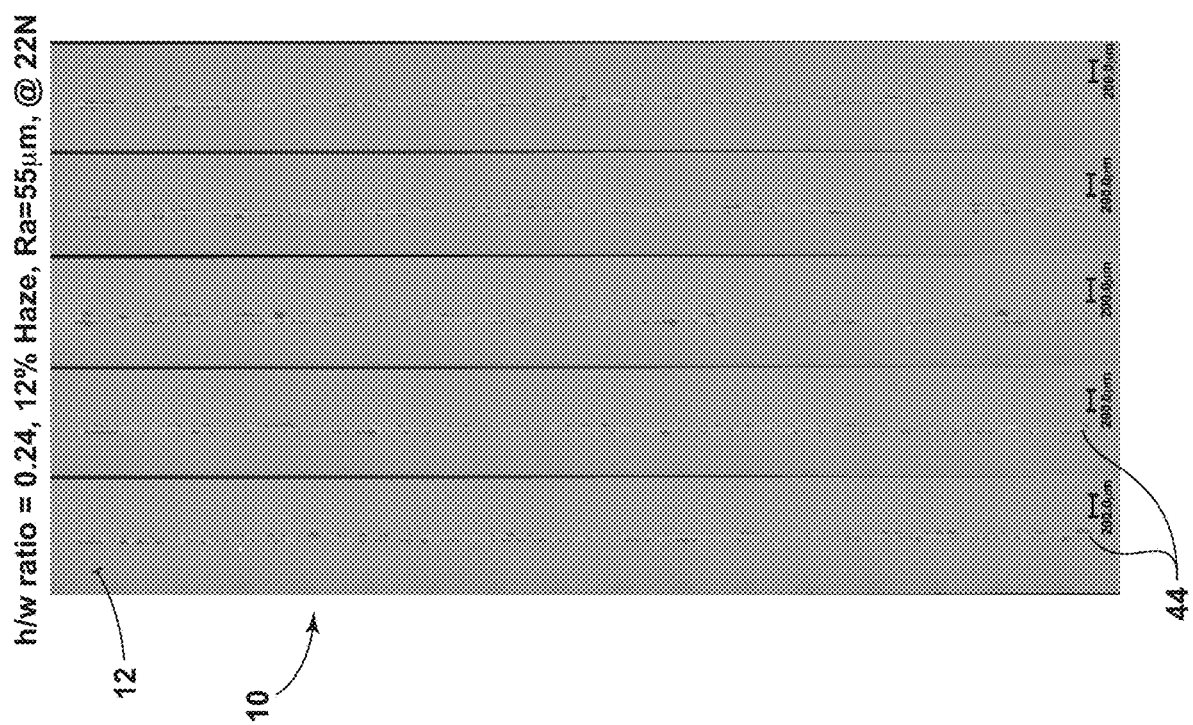
FIG. 6C is a photograph of a textured glass substrate with a haze of 12% and with surface features at the first surface having a height-to-width ratio of 0.24, illustrating a lack of cracks and chipping outside of the main scratch track.

Referring now to FIGS. 6A-6C, experimental evidence confirms the conceptual deduction from the previous paragraph. FIG. 6A is a photograph looking down facing the first surface 12 of the glass substrate 10 (fusion drawn, ion-exchanged GORILLA® glass, code 7418), for which the first surface 12 had not been textured (measured surface roughness Ra of less than 1 nm), after being scratched by a Knoop Indenter with a force of 10N. As the photograph reveals, there are significant lateral cracks 40 and chipping 42 outside of a main scratch track 44 (well beyond two times a width 46 of the main scratch track 44). FIGS. 6B and 6C are also photographs looking down facing the first surface 12 of the glass substrate 10 (fusion drawn, ion-exchanged GORILLA® glass, code 7418). However, in these photographs, the first surface 12 had undergone a texturing process with a resulting ratio of the height 26 of the surface feature 20 to the width 30 of the surface feature 20 of 0.24 (i.e., height 26/width 30=2*Ra/ALF=0.24). The Ra of the first surface 12 of FIG. 6B was 44 nm. The Ra of the first surface 12 of FIG. 6C was 55 nm. The force that the blunt object 34 (i.e., Knoop Indenter) applied while scratching the first surface 12 of the glass substrate 10 of FIG. 6B was 14N, and 22N for the glass substrate 10 of FIG. 6C. The scratching of the textured first surface 12 of the glass substrates 10 of FIGS. 6B and 6C, even under application of a higher amount of force (14N and 22N compared to 10N) did not cause noticeable lateral chipping or cracking beyond the main scratch track 44 such as illustrated in FIG. 6A. It is thought, as conceptualized in FIG. 5C, that the ratio of the height-to-width (0.24) of the surface features 20 of the textured first surface 12 of the glass substrates 10 of FIGS. 6B and 6C was too large to allow the tip 38 of the blunt object 34 (Knoop Indenter) to interact fully with the first surface 12 at the valleys 24 of the surface features 20. Equipment to perform this scratch test can be obtained from Bruker (formerly CETR), Nanovea, CSM Instruments, and others. Typically, the first surface 12 is gently cleaned with a non-abrasive cloth (optionally dampened with alcohol) or air canister before or after scratching, being careful to leave no residue or film. The tip 38 of the Knoop Indenter is cleaned with an alcohol dampened non-abrasive cloth between each scratch, again leaving no residue or film.

All sample glass substrates 10 discussed herein, whether textured or non-textured, were subjected to the same two-step ion-exchange schedule. In particular, in a first ion-exchange step, the glass substrates 10 were placed in a molten salt of 70 wt % $NaNO_3$ and 30 wt % $KNO_3$ at 380° C. for 4 hours. In a second ion-exchange step, the glass substrates 10 were placed in a molten salt of 7 wt % $NaNO_3$ and 93 wt % $KNO_3$ at 380° C. for 40 minutes. The ion-exchanged glass substrates 10 were then cleaned in high pH (pH from 10 to 13) detergent (2% SemiClean) at 70° C. for 12 minutes, then rinsed in deionized water. The samples were 0.8 mm thick. The result is that the glass substrate 10 has a layer that is contiguous with the first surface 12 that is under compressive stress.

Figure 7:
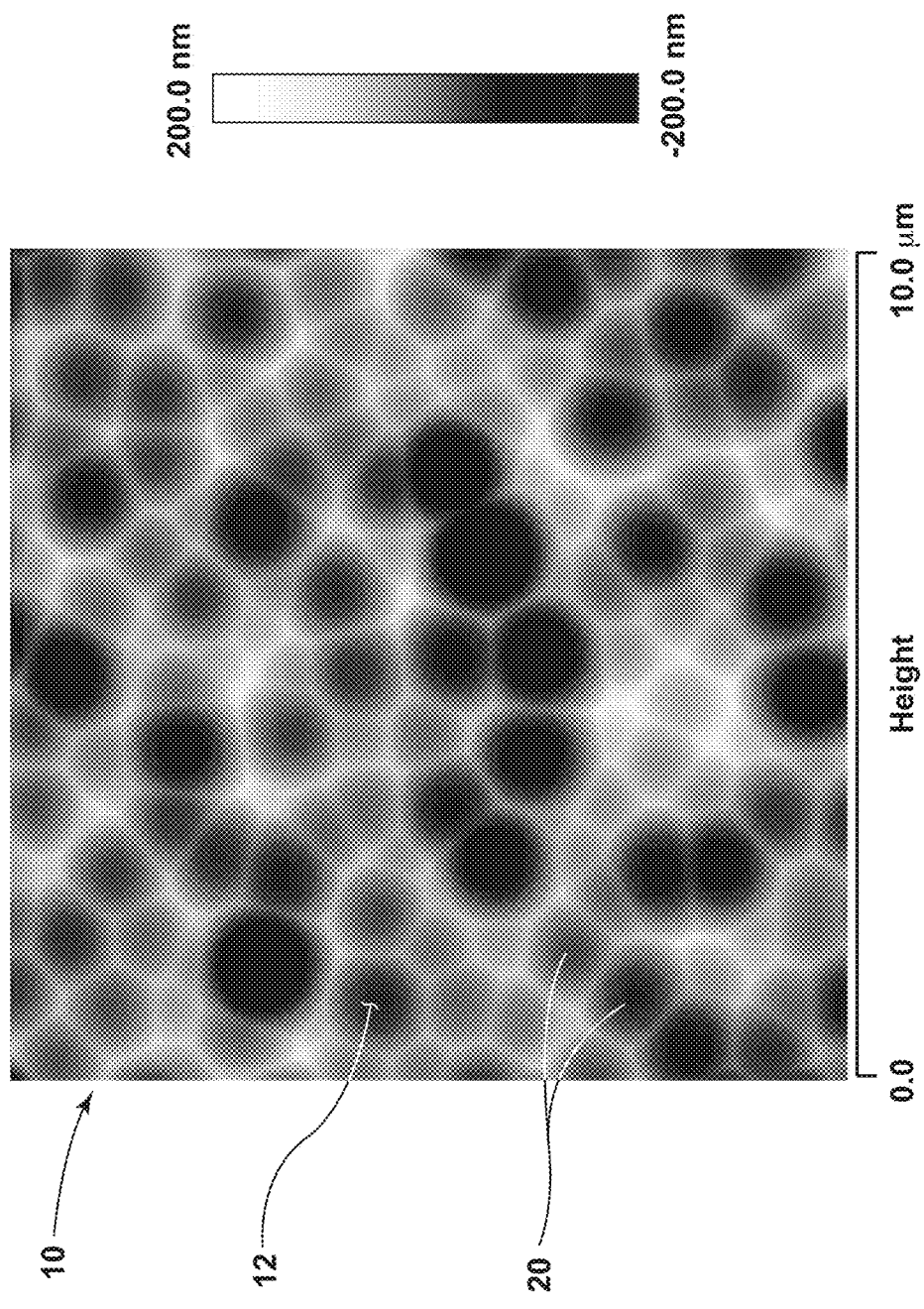
FIG. 7 is an AFM image of the first surface of a glass substrate that has been textured, illustrating that the texturing has created surface features on the first surface that take a cellular matrix-like appearance.

Referring back to FIG. 3A and additionally to FIG. 7, those figures depict the cellular matrix nature of the textured first surfaces 12 of the glass substrate 10. FIGS. 3A and 7 are AFM images. Veeco Instruments Inc. provides AFM instrumentation, as well as tools to calculate surface roughness Ra. The first surface 12 depicted in FIG. 3A has surface features 20 with a height-to-width ratio of 0.24, a surface roughness Ra of 41.7 nm, and a haze of 8.3%. The first surface 12 depicted in FIG. 5B has surface features 20 with a height-to-width ratio of 0.065, a surface roughness Ra of 35.3 nm, and a haze of 7.5%. "Haze" (also referred to as "transmission haze") is a surface light scatter characteristic and refers to the percentage of light scattered outside an angular cone of 4.0° in accordance with ASTM procedure D1003. For an optically smooth surface, transmission haze is generally close to zero. Low haze can be desirable for applications requiring high display contrast, while high haze can be useful for optical designs having scattering, such as edge illumination, or for aesthetic reasons, such as reducing the "black hole" appearance of the display in the off state. The general preference for low versus high haze (and the acceptance of performance trade-offs) can be motivated by customer or end-user preferences, and their final application and use mode.

Figure 8:
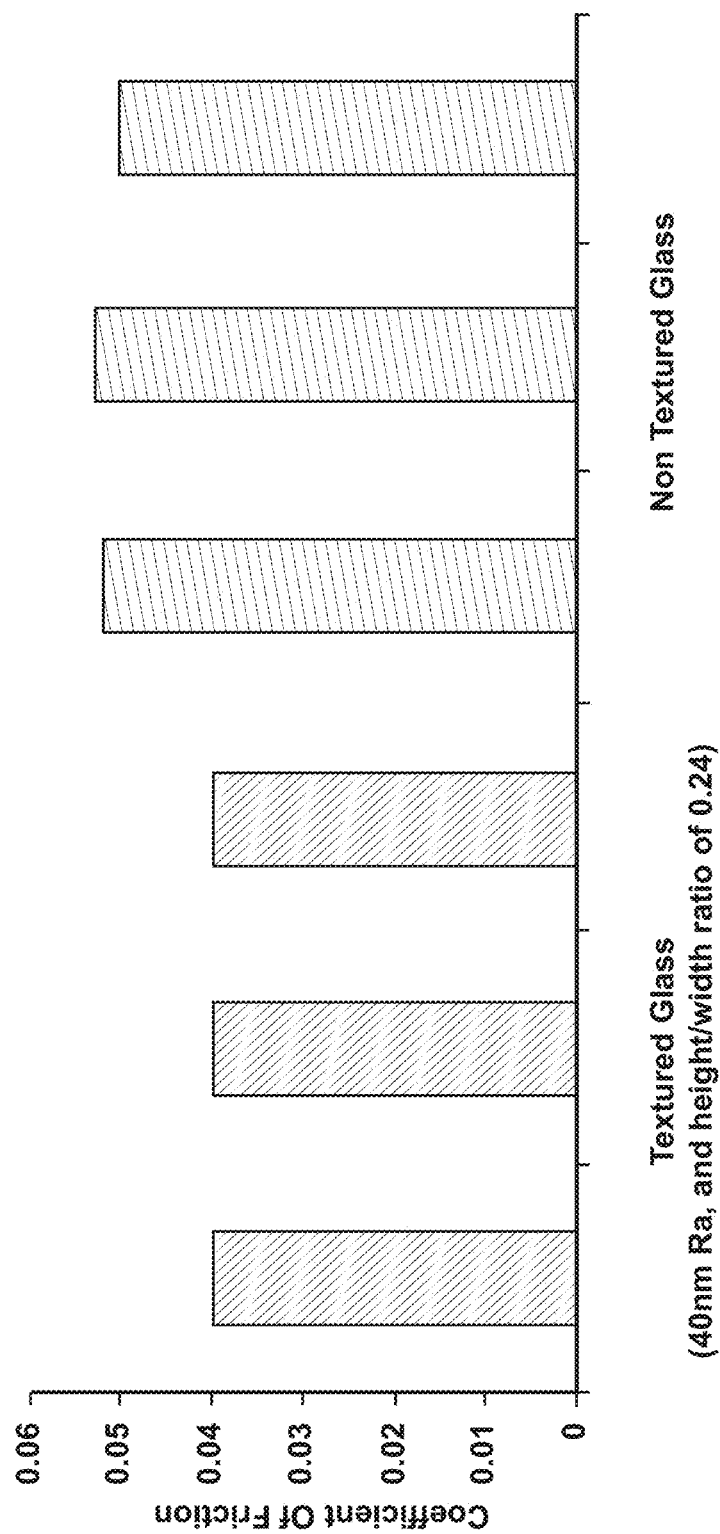
FIG. 8 is a graph reporting experimental results of measured coefficient of friction between the tip of the blunt object (Knoop Indenter) and the first surface of a glass substrate that has not been textured and the first surface of a glass substrate that has been textured to have surface features with a height-to-width ratio of 0.24, the measured coefficient of friction being lower for the latter than the former.

The graph reproduced at FIG. 8 provides further experimental evidence confirming the conceptual deduction above. In the testing providing the results illustrated in FIG. 8, the coefficient of friction between the tip 38 of the blunt object 34 (Knoop Indenter) and the first surface 12 of the glass substrate 10 of FIGS. 6A (non-textured) and 6B (textured, 0.24 height 26/width 30 ratio, Ra of 40 nm) were measured. The coefficient of friction for the non-textured glass substrate 10 of FIG. 6A were all approximately 0.05 or higher. The coefficient of friction for the textured glass substrate 10 of FIG. 6B were all approximately 0.04 or lower, and decidedly lower than the coefficient of friction measured for the samples of the non-textured glass substrate 10 of FIG. 6A. The surface features 20 having a sufficiently high ratio of height-to-width is thought to prevent the tip 38 of the blunt object 34 (Knoop Indenter) from fully interacting with the first surface 12 at the valleys 24 of the surface features 20, thus reducing the coefficient of friction relative to the non-textured first surface 12 of FIG. 6A and thus reducing the lateral cracking and chipping upon scratch.

Figure 9:
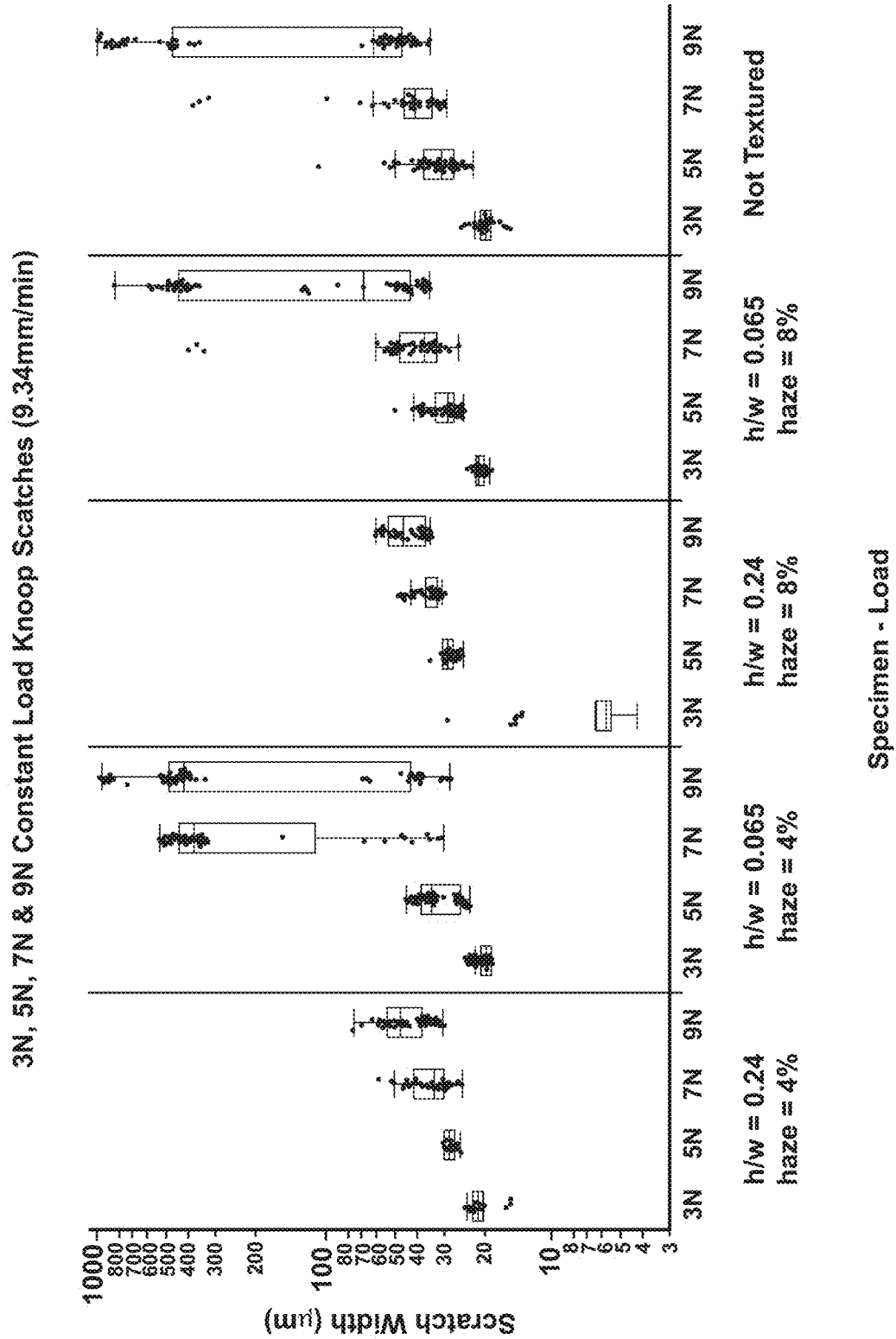
FIG. 9 is a graph plotting measured scratch width left by the tip of the blunt object (Knoop Indenter) as a function of force applied by the blunt object and the topology of the first surface, as follows—(1) a textured first surface with surface features having a height-to-width ratio of 0.24 and a haze value of 4%; (2) a textured first surface with surface features having a height-to-width ratio of 0.065 and a haze value of 4%; (3) surface features having a height-to-width ratio of 0.24 and a haze value of 8%; (4) a textured first surface with surface features having a height-to-width ratio of 0.065 and a haze value of 8%; and (5) a non-textured first surface—illustrating that the first surface having surface features with a height-to-width ratio of 0.24 provided the narrowest scratch width.

The graph reproduced at FIG. 9 provides further experimental evidence confirming the conceptual deduction above, including the notion that as the height-to-width ratio of the surface features 20 are decreased from larger ratios such as 0.24, the ratio will only somewhat prevent the tip 38 of the blunt object 34 (Knoop Indenter) from fully interacting with the first surface 12 and the scratch width will begin to equalize with that a non-textured first surface 12 provide. In producing the graph illustrated at FIG. 9, five sets of samples of the glass substrate 10 were prepared. From left to right along the graph: (1) the first set of samples of the glass substrate 10 had a textured first surface 12 having surface features 20 with a height-to-width ratio of 0.24 and a measured haze of 4%; (2) the second set of samples of the glass substrate 10 had a textured first surface 12 having surface features 20 with a height-to-width ratio of 0.065 and a measured haze of 4%; (3) the third set of samples of the glass substrate 10 had a textured first surface 12 having surface features 20 with a height-to-width ratio of 0.24 and a measured haze of 8%; (4) the fourth set of samples of the glass substrate 10 had a textured first surface 12 having surface features 20 with a height-to-width ratio of 0.065 and a measured haze of 8%; and (5) the fifth set of samples of the glass substrate 10 were non-textured. All samples were the same glass substrate 10 composition. Four samples from each set of samples were then scratched with the blunt object 34 (Knoop Indenter) at a constant force and at a rate of 9.34 mm/min. Each of the four samples from each set of samples were scratched with the blunt object 34 (Knoop Indenter) imparting a different level of force (3N, 5N, 7N, and 9N), although the level of force applied was constant during the scratch event. The lateral width 46 of the main scratch track 44 was then measured and graphed. As the graph reveals, scratching of the samples from the first set of samples and third set of samples having surface features 20 with a height-to-width ratio of 0.24 resulted in a range of main scratch track 44 lateral widths 46 that were much narrower than the second and fourth sets of samples having surface features 20 with a height-to-width ratio of 0.065 and the fifth set of samples with a non-textured first surface 12. The difference in lateral width 46 of the main scratch track 44 is most pronounced at the higher force levels of 7N and 9N, but is also apparent at force levels of 3N and 5N. Further, although the samples having surface features 20 with a height-to-width ratio of 0.24 provided superior results over non-textured samples and samples having surface features 20 with a height-to-width ratio of 0.065, the glass samples with the height-to-width ratio of 0.065 showed a range of scratch track 44 lateral widths 46 about equal to the range of scratch track 44 lateral widths 46 that the non-textured glass samples showed. In other words, while the ratio of 0.24 showed the most superior performance, glass samples with the ratio of 0.065 performed about equal to the non-textured glass samples.

In addition, those results evidence that the surface features 20 having different ratios of height-to-width can provide the same haze value, and that the surface features 20 having the same ratio of height-to-width can provide different haze values. In some embodiments, the first surface 12 has a haze value from 0.1% to 100, including 0.1% to 40%, including from 3.0% to 40%, from 3% to 15%, from 3.5% to 12.5%, and from 3.5% to 8.5%. It is thought, without being bound by theory, that surface features 20 having different ratios of height-to-width can provide the same haze value, and surface features having the same ratio of height-to-width can provide different haze values, because haze value is likely a function of the geometry of the surface features 20 (such as the curvature of the valleys 24), which is not totally dependent upon the ratio of height-to-width.

Figure 10:
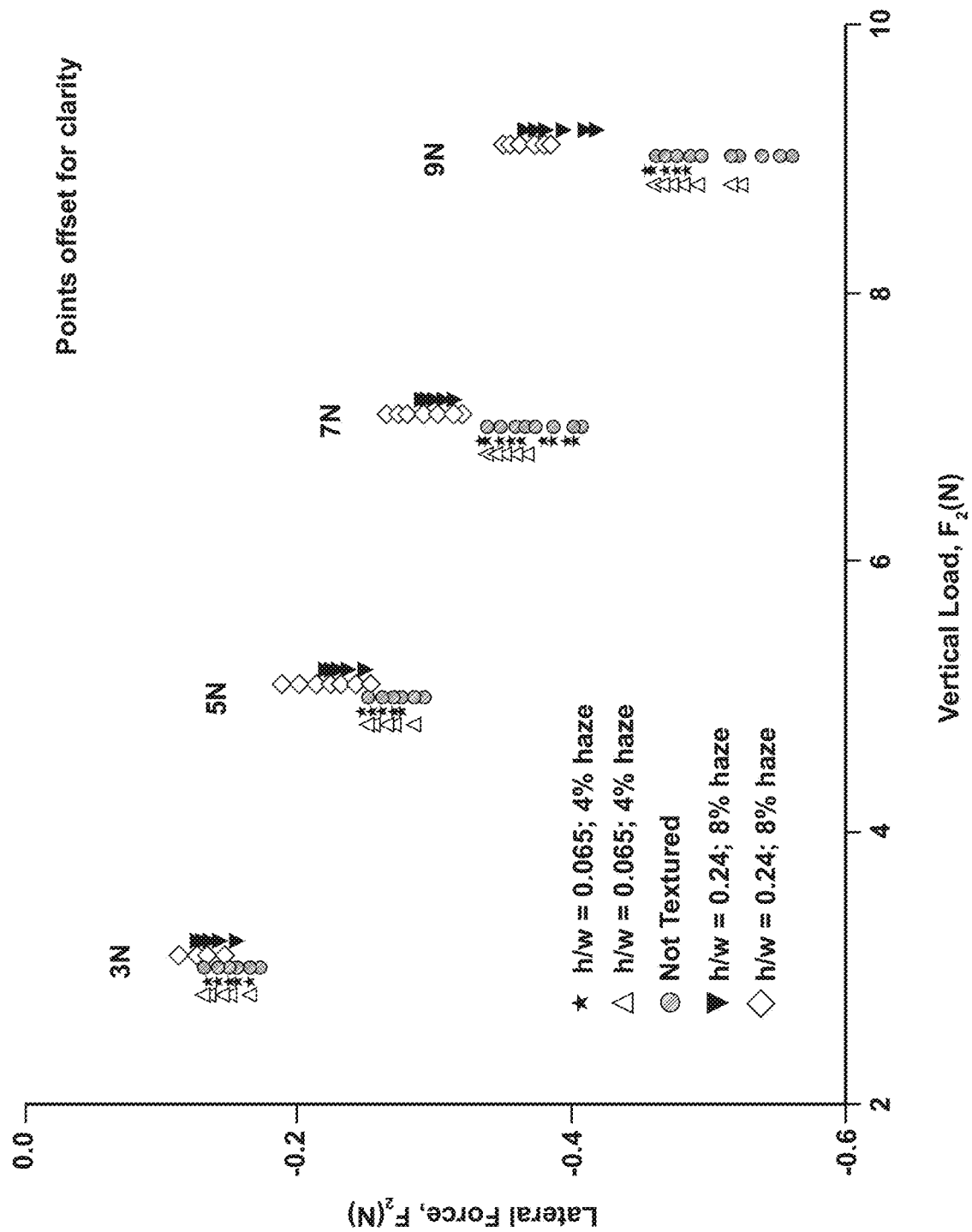
FIG. 10 is a graph plotting measured lateral force ($F_x$) as a function of applied vertical force ($F_z$) and the topology of the first surface of the samples described above in relation to FIG. 9, illustrating that the first surface having surface features with a height-to-width ratio of 0.24 provided the smallest (closest to 0) measured lateral force ($F_x$)

Referring now to FIG. 10, in addition to the lateral width 46 of the main scratch track 44 that the blunt object 34 (Knoop Indenter) imparted upon the first surface 12 of the various sets of samples, the lateral force ($F_x$) that the blunt object 34 (Knoop Indenter) imparted was measured as a function of the vertical force ($F_z$) for each set of samples. In general, the sets of samples with the surface features 20 having a height-to-width ratio of 0.24 experienced less lateral force than the sets of samples with a non-textured first surface 12 or with the surface features 20 having a height-to-width ratio of 0.065. The difference in experienced lateral force ($F_x$) was more pronounced the higher the applied vertical force ($F_z$). The difference in experienced lateral force ($F_x$) may explain the difference in the measured lateral width 46 of the main scratch track 44 discussed above.

Figure 11B:
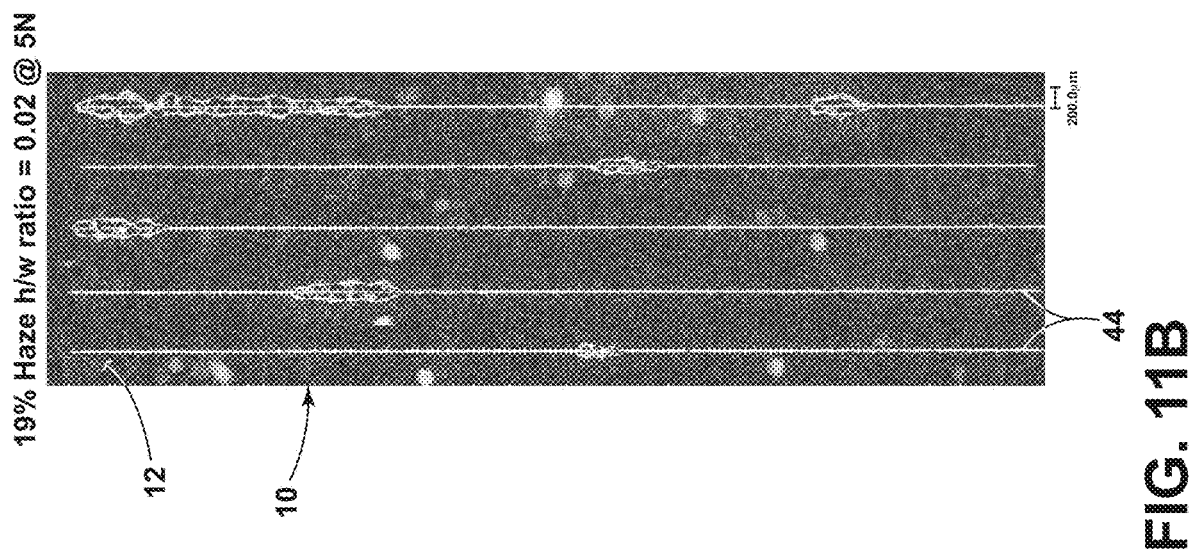
FIG. 11B is a photograph of a textured glass substrate with a haze of 19% and with surface features at the first surface having a height-to-width ratio of 0.02, illustrating chipping outside of the main scratch track.
Figure 11A:
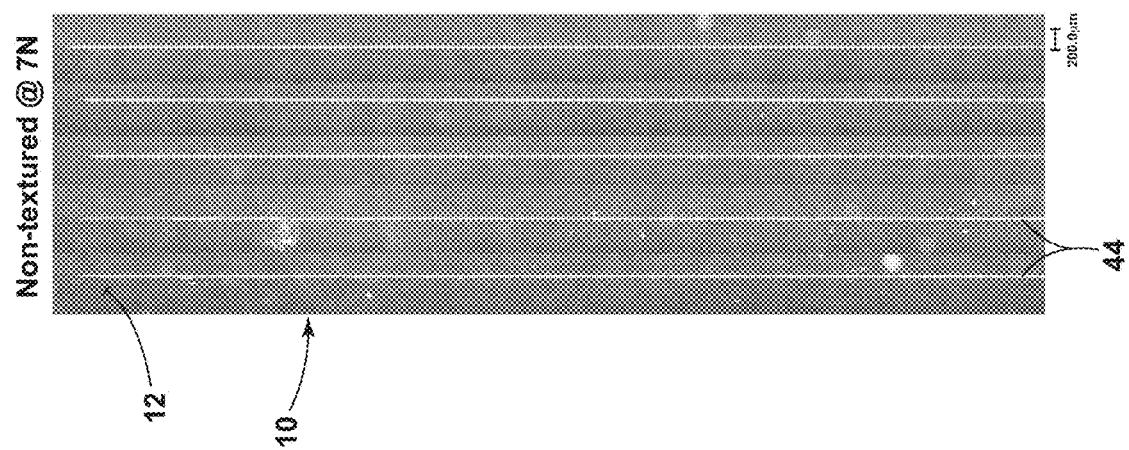
FIG. 11A is a photograph of a non-textured glass substrate after being scratched by the blunt object of FIG. 4 (Knoop Indenter), illustrating chipping outside of the main scratch track.

Referring now to FIGS. 11A and 11B, however, as the height-to-width ratio continues to decrease from 0.065 toward 0 (non-textured), the resistance of the first surface 12 to the blunt object 34 scratches deteriorates to become worse than a non-textured first surface 12. The FIG. 11A, like FIG. 6A, is a photograph looking down facing the first surface 12 of the glass substrate 10, for which the first surface 12 had not been textured. The FIG. 11B, like FIGS. 6B-6C, is a photograph looking down facing the first surface 12 of the glass substrate 10, for which the first surface 12 has undergone a texturing process. The resulting height-to-width ratio of the surface features 20 for the first surface 12 of that glass substrate 10 is 0.02 (i.e., height 26/width 30=2*Ra/ALF=0.02). The first surfaces 12 of both the glass substrates 10 were subjected to scratching with the top 38 of the Knoop Indenter. As revealed at FIG. 11B, the first surface 12 of the glass substrate 10 that had been textured to achieve a surface feature 20 height-to-width ratio of 0.02 showed significant chipping at an applied scratch force of 5N. However, as revealed at FIG. 1A, the first surface 12 of the non-textured glass substrate 10 resisted chipping at a greater applied scratch force of 7N. As mentioned above, surface features 20 having a height-to-width ratio of 0.065 provided blunt object 34 scratch performance essentially equal to the non-textured first surface 12. As the height-to-width ratio of the surface features 20 is raised above 0.065 (as evidenced at a ratio of 0.24), the tip 38 of the blunt object 34 cannot to interact fully with the first surface 12 at the valleys 24 of the surface features 20. As the ratio is lowered below 0.065 (as evidenced at a ratio of 0.02), the tip 38 of the blunt object 34 (Knoop Indenter) not only is able to fully interact with the first surface 12 at the valleys 24 of the surface features, but the peaks 22 of the surface features 20 provide greater resistance (greater coefficient of friction to the tip 38) than a non-textured first surface 12. The greater resistance results in the tip 38 chipping the glass substrate 10 move easily than if the first surface 12 was non-textured. It is thought that a ratio of 0.06 is approximately the threshold ratio at which the peaks 22 of the surface features 20 no longer prevent the tip 38 of the blunt object 34 from interacting with the valleys 24 between the adjacent peaks 22 and, instead, begin to offer resistance to the tip 38 that leads to easier chipping than a non-textured first surface 12.

Figure 12:
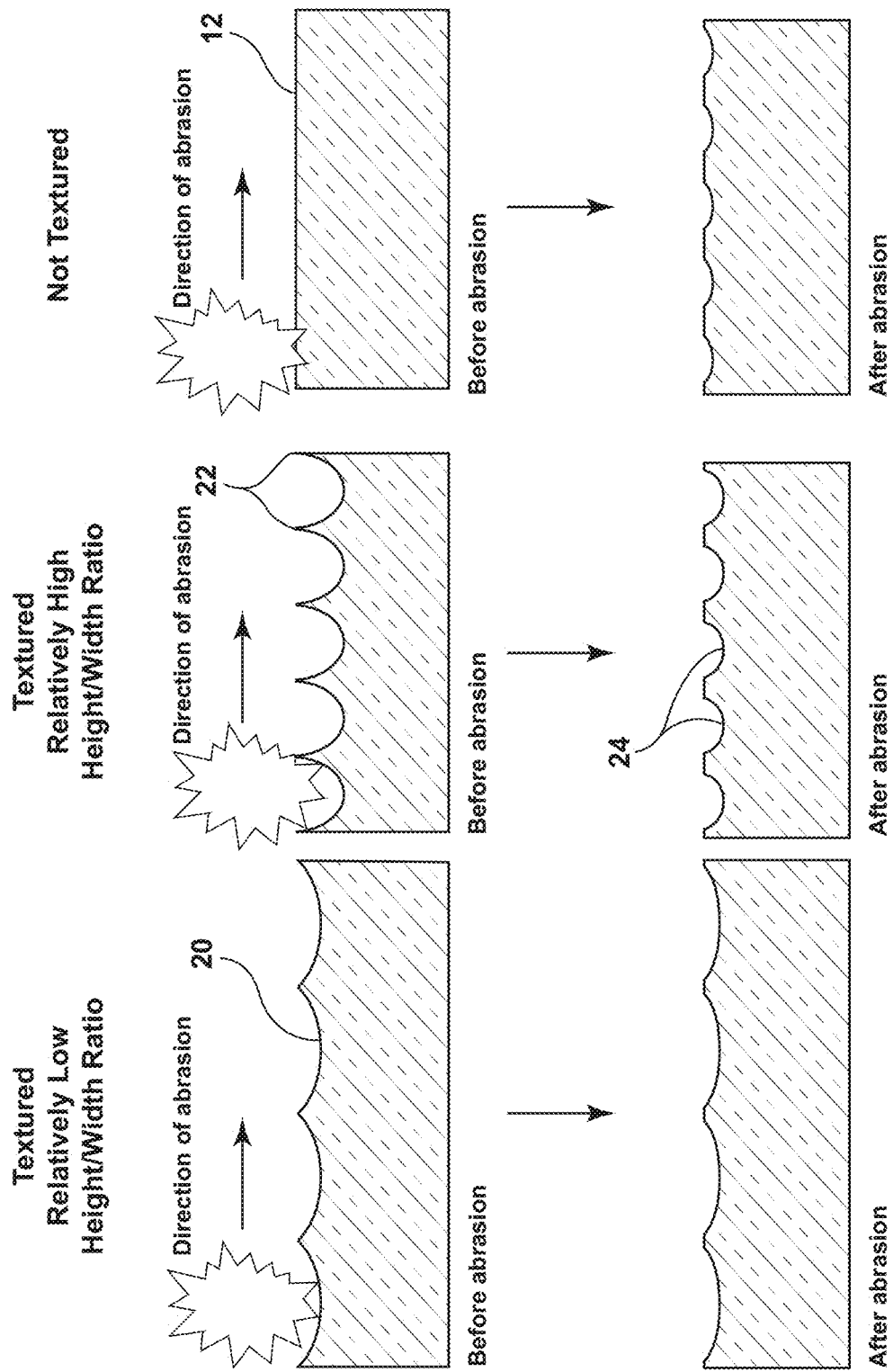
FIG. 12 a conceptual cross-sectional diagram of first surfaces having various topologies being lightly but repeatedly scratched, illustrating that light but repeated scratching affects the first surface of a non-textured first surface and a textured first surface having surface features with a relatively high height-to-width ratio more than a textured first surface having surface features with a relatively low height-to-width ratio.

As mentioned above, when considering the response of the first surface 12, which has been textured, to a scratch event, there are at least two general types of scratch events to consider—the second type being relatively light in force but repeated multiple times over a wider surface area of the first surface 12. As conceptualized in FIG. 12, the relatively light but repeated scratches of the first surface 12 alters the first surface 12 (see "before abrasion" versus "after abrasion"). More specifically, when the first surface 12 is textured, as conceptualized at the left column and the middle column identified "Textured," the scratches remove a portion of the peaks 22 of the surface features 20. In comparing the left column and the middle column, the higher the height-to-width ratio of the surface features 20 of the textured first surface 12 (the middle column "relatively high height/width ratio"), the greater the amount of peaks 22 the scratch event removes, thus more greatly altering the appearance and optical properties of the first surface 12. In addition, the higher the ratio of height-to-width of the surface features 20 (middle column), the more able the valleys 24 of the surface features 20 are to store debris generated during the scratch event, further altering the appearance and optical properties of the first surface 12. When the first surface 12 is not textured as at the right column ("not textured"), the scratch event generates texture on the first surface 12 that did not previously exist and thus can significantly alter the appearance and light diffraction of the first surface 12. Therefore, there is presumably a height-to-width ratio of the surface features 20 of the textured first surface 12 that will provide the least amount of change of appearance and optical properties upon light but repeated scratches.

Figure 13:
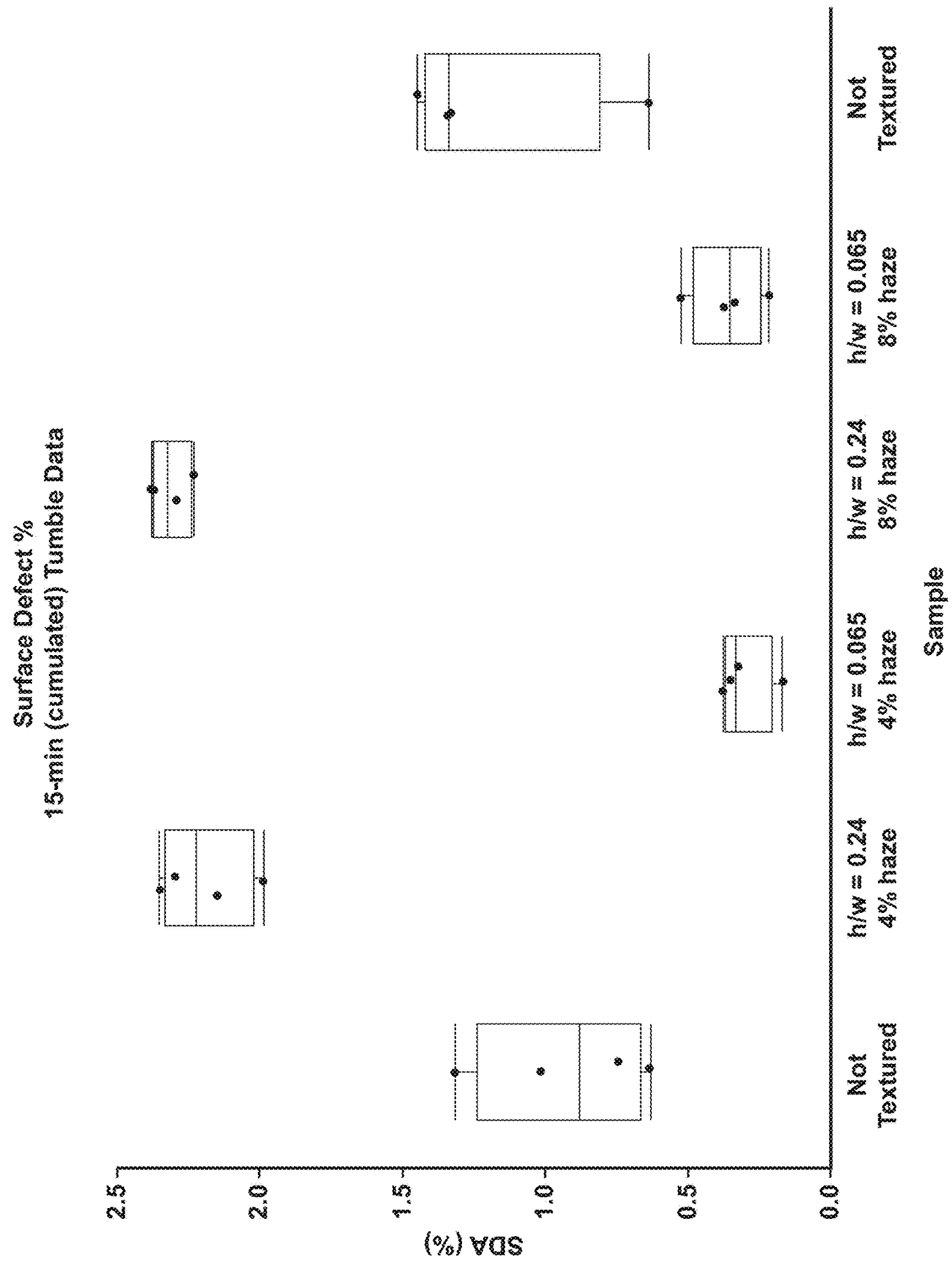
FIG. 13 is a graph plotting the percent of a first surface having defects after tumbling (simulating light but repeated scratching of the first surface) as a function of the topology of the first surface for various sample glass substrates described above in relation to FIG. 9, illustrating that the first surface having surface features with a height-to-width ratio of 0.065 resulted in the lowest percentage of surface defects.

Referring now to FIG. 13, experimental evidence confirms the conceptual deduction stated in the previous paragraph. Samples of non-textured and textured first surfaces 12 of glass substrates 10 (four of each sample) having various height-to-width ratios of the surface features 20 were subjected to a tumble test. The tumble test simulates light but repeated scratching onto the first surface 12 of the glass substrate 10. More specifically, the samples of the glass substrates 10 were each placed into a tumbler, along with other common items the glass substrate 10 would likely come into contact with during normal use, including house keys, coins, an emery board, etc.), and tumbled for 15 minutes. After the tumbling period, each glass substrate 10 sample was viewed under an optical microscope (Keyence VHX 5000). An image analysis was performed to identify the number of pixels of the image that showed a scratch(s). The percentage of the first surface 12 of the glass substrate 10 having a defect was calculated dividing the number of pixels of the image that showed a scratch(s) divided by the total number of pixels analyzed, with each pixel representing the same surface area. The samples tested were five each of: (1) non-textured, ion-exchanged, GORILLA® glass formula 7418; (2) textured, ion-exchanged, GORILLA® glass formula 7418, having a height-to-width ratio of 0.24 and a haze of 4%; (3) textured, ion-exchanged, GORILLA® glass formula 7418, having a height-to-width ratio of 0.065 and a haze of 4%; (4) textured, ion-exchanged, GORILLA® glass formula 7418, having a height 26 to width 30 ratio of 0.24 and a haze of 8%; (5) textured, ion-exchanged, GORILLA® glass formula 7418, having a height-to-width ratio of 0.065 and a haze of 8%; and (6) non-textured, ion-exchanged, GORILLA® glass formula 7518. As FIG. 12 reveals, the tumbling produced the least percentage of surface defects upon the textured glass substrates 10 having the surface feature 20 height-to-width ratio of 0.065, even lower than the non-textured glass substrates 10. Tumbling produced the greatest percentage of surface defects upon the textured glass substrates 10 having the surface feature 20 height-to-width ratio of 0.24, even higher than the non-textured glass substrates 10. As discussed above, that is likely because the peaks 22 of the surface features 20 were removed during tumbling and the peaks 22 retained the resulting residue. The results of this test confirm the conceptual deduction from above—that repeated light scratching of the textured surface features 20 having a height-to-width ratio within a certain range will produce the least optically noticeable defects. It is currently believed that surface features 20 having a height-to-width ratio of under 0.08 (thus including the ratio of 0.065) will produce an equal to or lower percentage of surface defects compared to non-textured glass substrates 10 in response to light but repeated scratching (e.g., tumble test).

Synthesizing the above discussions of the effect of the surface feature 20 height-to-width 30 ratio for textured glass substrates 10 on: (i) resistance to the blunt object 34 scratches; and (ii) maintaining optical appearance after repeated yet light scratches, reveals that there is a range of height-to-width ratios that provides not only glare reduction but also equal to or superior beneficial results over non-textured glass substrates 10, in contrast to prior art efforts. As discussed above, texturing the first surface 12 of the glass substrates 10 can be beneficial for a particular application to reduce glare, but such texturing had heretofore made the glass substrate 10 more susceptible to scratches. However, the present disclosure reveals that texturing that provides the surface features 20 having a height-to-width ratio of 0.06 or above (including 0.24) results in equal to or superior resistance to the blunt object 34 scratches compared to non-textured glass substrates 10 and compared to textured glass substrates 10 having a height-to-width ratio of below 0.06 (such as 0.02). The ratio of 0.06 is apparently the critical threshold ratio above which such equal to or superior blunt object 34 scratch resistance is achieved. In addition, the present disclosure reveals that texturing that provides the surface features 20 having a height-to-width ratio below approximately 0.08 (such as 0.065) results in equal to or superior resistance to light but repeated scratching compared to non-textured glass substrates 10 and compared to textured glass substrates 10 having a height-to-width ratio of above 0.08 (such as 0.24). Consequently, texturing that provides the surface features 20 having a height-to-width ratio of 0.06 to 0.08 results in equal to or superior resistance to both the blunt object 34 scratches and light but repeated scratching compared to non-textured glass substrates 10 and compared to textured glass substrates 10 having a height-to-width ratio outside of that range of 0.06 to 0.08. The tradeoff of reduced glare for decreased scratch performance that texturing the glass substrate 10 heretofore presented no longer exists if the height-to-width ratios of the surface features 20 are within the range of 0.06 to 0.08. This should result in increased acceptance of the textured glass substrates 10 in many applications. If the particular application of the glass substrate 10 only requires reduced glare and equal to or superior resistance to the blunt object 34 scratches compared to non-textured glass substrates 10, then the height-to-width ratio of the surfaces features 20 within the expanded range of 0.06 to 0.24 can be utilized. If the particular application of the glass substrate 10 only requires reduced glare with equal to or superior resistance to the light but repeated scratches compared to non-textured glass substrates 10, then the height-to-width ratio of the surfaces features 20 within the expanded range of 0.08 and below can be utilized.

Figure 14:
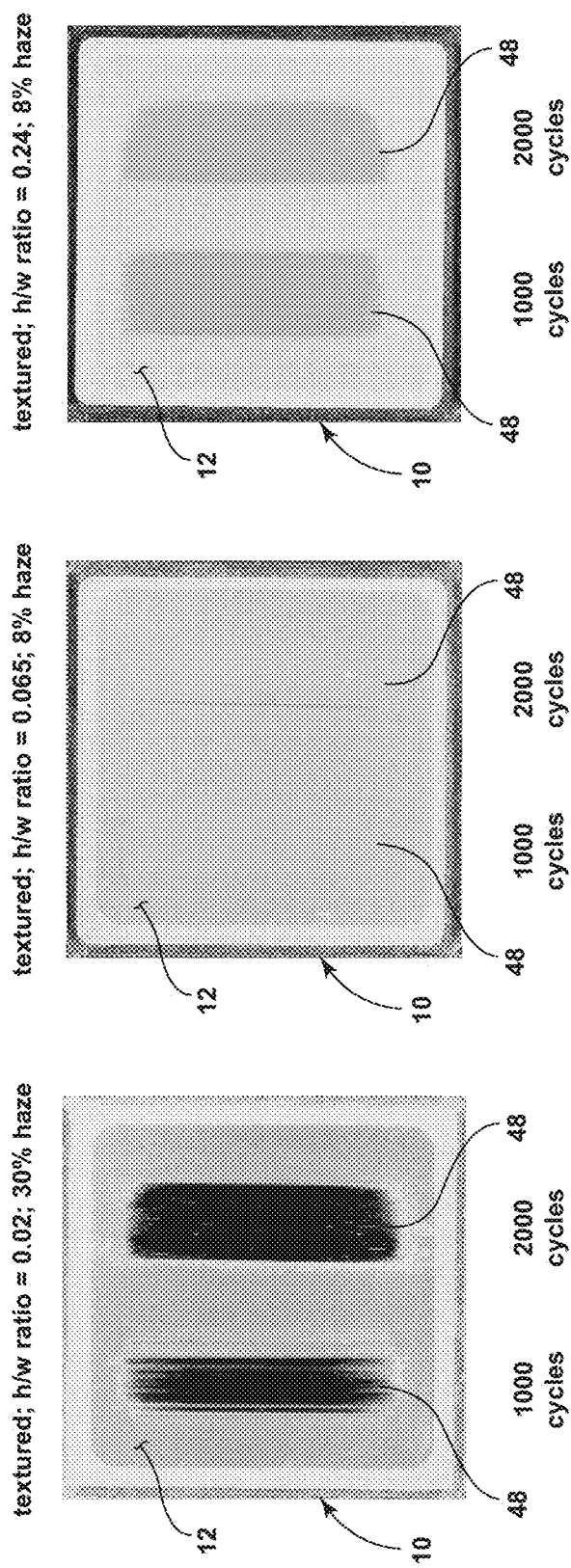
FIG. 14 is a series of photographs of textured first surfaces of glass substrates having surface features of various height-to-width ratios after undergoing an abrasion test, illustrating that the effect of repeated abrasions on the glass substrate with surface features having a height to width ratio of 0.065 was practically invisible while the effect of repeated abrasions on the glass substrates with surface features having height to width ratios of 0.02 and 0.24 was very visible.
Figure 15:
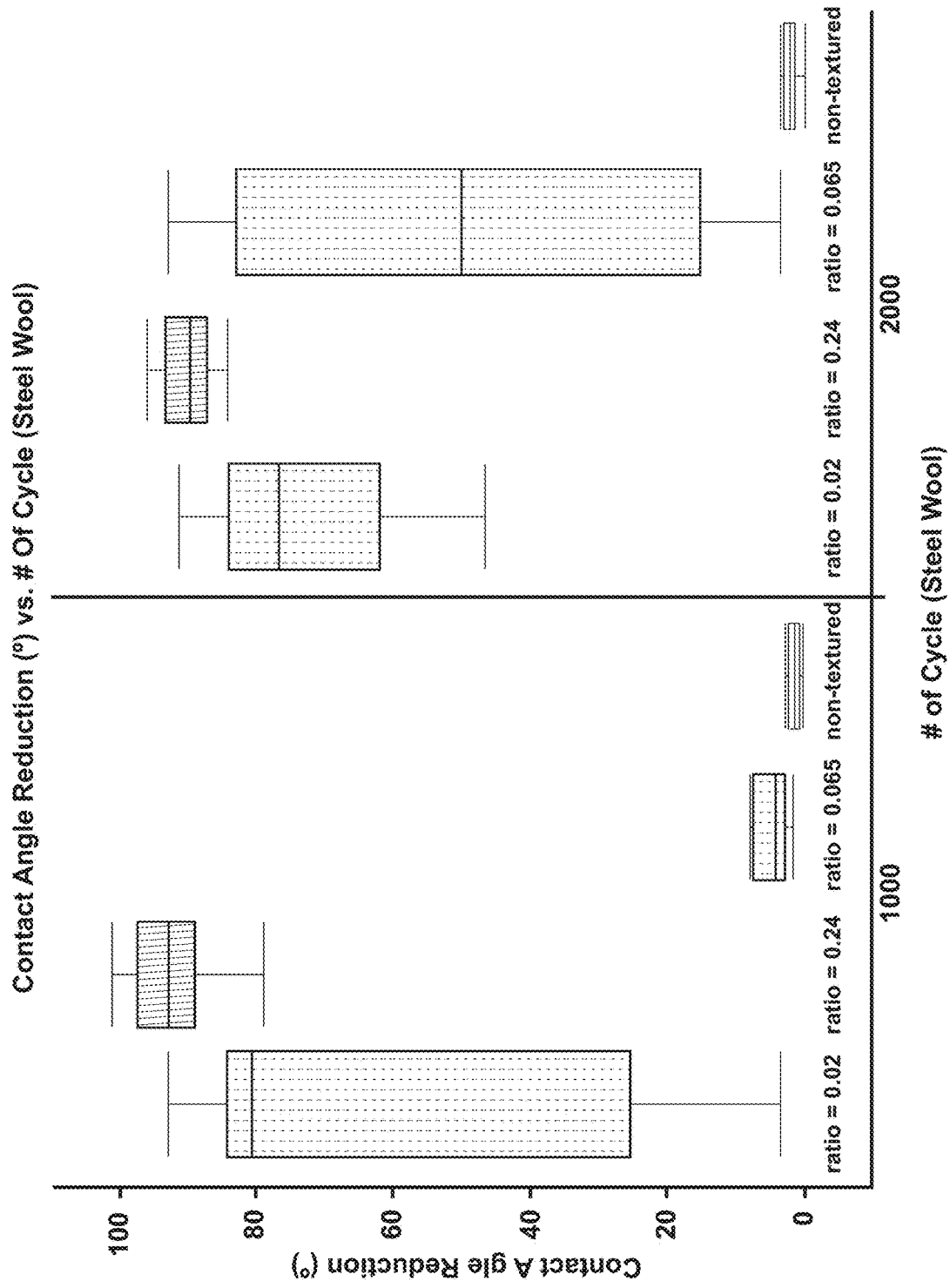
FIG. 15 is a graph showing the reduction in water contact angle on the first substrate 12 of the various glass substrates 10 depicted at FIG. 14, illustrating that the effect of repeated abrasions on the glass substrate with surface features having a height to width ratio of 0.065 is superior in terms of water contact angle reduction than the effect of repeated abrasions on the glass substrates with surface features having height to width ratios of 0.02 and 0.24.

Referring now to FIGS. 14 and 15, abrasion testing was performed on the first surfaces 12 of the glass substrates 10 that were (1) non-textured; (2) textured to achieve surface features 20 having a height-to-width ratio of 0.02; (3) textured to achieve surface features 20 having a height-to-width ratio of 0.065; and (4) textured to achieve surface features 20 having a height-to-width ratio of 0.24. The abrasion testing consisted of contacting the first surface 12 of the glass substrate 10 with steel wool and linearly moving the steel wool over the first surface 12 under constant load (1 kg) for a fixed distance (40 mm), repeating the movement a fixed number of times—1,000 times for one test, 2,000 times for another test. The textured glass substrates 10 with ratios of 0.065 and 0.24 exhibited 8% haze, while the textured glass substrate 10 with a ratio of 0.02 exhibited 30% haze. As FIG. 14 reveals, the steel wool left an abrasion path 48 on the textured first surface 12 having surface features 20 with a ratio of 0.065 after 1,000 cycles that was essentially invisible, and after 2,000 cycles that was barely visible. However, the steel wool left very visible abrasion paths 48 on the textured first surfaces 12 having surface features 20 with ratios of 0.02 and 0.24 after both 1,000 cycles and 2,000 cycles. As for the non-textured first surface 12, the abrasion path 48 was not visible after both 1,000 cycles and 2,000 cycles.

The effect of the steel wool abrasions is more quantitatively illustrated at FIG. 15, which illustrates the reduction in water contact angle on the first surface 12 after the abrasion testing compared to before the abrasion testing. As FIG. 14 reveals, the water contact angle reduction for the glass substrate 10 with the ratio of 0.065 was similar to the non-textured glass substrate 10, after 1,000 cycles, while the water contact angle reduction for the glass substrate 10 with the ratios of 0.02 and 0.24 was much higher. After 2,000 cycles, the water contact angle reduction for the glass substrate 10 with the ratio of 0.065 was not as close to the non-textured glass substrate 10 but still better than the textured glass substrates 10 with the ratios of 0.02 and 0.24. It is currently believed that surface features 20 having a height-to-width ratio between 0.06 and 0.08 (thus including the ratio of 0.065) will produce optimal abrasion protection for textured first surfaces 12 that are comparable visually to non-textured glass substrates 10. This ratio range of 0.06-0.08 of abrasion performance that is better than the ratios of 0.02 and 0.24 is consistent with the ratio range of 0.06-0.08 that provided optimal light but repeated scratch resistance, as described above.

Textured glass substrates 10 having the surface feature 20 height-to-width ratios from about 0.065 to about 0.24 were prepared using either a one-step process of acid leaching (for the surface feature 20 height-to-width ratio of 0.24) or a two-step process of acid leaching followed by chemical polishing (for the surface feature 20 height-to-width ratio of 0.065). The acid leaching step includes placing the glass substrate 10 into a vessel that includes a non-hydrofluoric acid, low pH etchant, for a time period of 80 to 120 minutes. The acid leaching step results in a textured first surface 12 with the surface features 20 having a height-to-width ratio of 0.24 (or approximately 0.24) and a haze value from 0.1% to 100%, including a haze value from 0.1% to 40%. The non-HF, low pH etchant, can be, for example, citric acid, sulfuric acid, or hydrochloric acid. Other organic acids providing a pH below 4 and preferably below 3 can be utilized.

The chemical polishing step utilizes a solution of NaOH and brings the height-to-width ratio down to the desired ratio, such as below 0.08, or between 0.04-0.08, or about 0.065. Tuning the time of acid leaching and chemical polishing can provide a textured first surface 12 with a desired haze level and the surface features 20 with the desired height-to-width ratio.

In a specific example, the glass substrates 10 were laser scribed with a label. The glass substrates 10 were then cleaned with a five minute rinse with distilled water, followed by a two-minute soak in 4 wt % SemiClean detergent at 60° C. with ultrasonification. The glass substrates 10 were then rinsed again with distilled water for 5 minutes, followed by a final rinse in Type I (ASTM D1193-91) water (18.2 MΩ*cm resistivity). The glass substrates 10 were then dried at 110° C. for at least one hour. The glass substrates 10 were then measured for weight and baseline optical measurements.

The glass substrates 10 were then placed in a Teflon® vessel containing 20 wt % citric acid with 1M $FeCl_3$ at boiling with a condenser attached. This leach layer was removed with a 10 minute soak in 4 wt % SemiClean detergent at 60° C. with ultrasonification. The glass substrates 10 were then rinsed with distilled water for 5 minutes, followed by a final rinse with Type 118.2 MΩ*cm resistivity water. The glass substrates 10 were then dried at 110° C. for at least one hour. The acid leached glass substrates 10 were then measured for weight and baseline optical measurements. This acid leaching resulted in the surface features 20 having a height-to-width ratio of 0.24. A haze of 4% was achieved with a leaching time of 80.95 minutes. A haze of 8% was achieved with a leaching time of 87.31 minutes. In some embodiments, the leaching time is from 80 to 120 minutes. The addition of $FeCl_3$ not only slightly reduces the pH but also precipitates the byproduct ($SiO_x$) and decreases leaching time.

The acid leached glass substrates 10 were then soaked in 10 wt % NaOH for 30 minutes at 95° C. The thus chemically polished acid leached glass substrates 10 were then rinsed with deionized water, then finally rinsed with Type I 18.2 MΩ*cm resistivity water. The glass substrates 10 were then dried at 110° C. for at least one hour. The glass substrates 10 were then measured for final optical properties. The chemical polishing step resulted in the surface features 20 having a height-to-width ratio of 0.065. A haze of 4% was achieved with a leaching time of 92.44 minutes. A haze of 8% was achieved with a leaching time of 105.37 minutes. In some embodiments, the acid leached glass substrate 10 is soaked in a solution including NaOH for a time period of 15 minutes to 45 minutes.

Instead of the non-HF, low pH etchant, either sandblasting or an HF etchant with a crystallization reagent such as ammonium fluoride, ammonium bifluoride, potassium chloride, or sodium fluoride could be used. Instead of NaOH for the chemical polishing step, HF or another base such as KOH could be used.

It will be apparent to those skilled in the art that various modifications and variations can be made without departing from the spirit or scope of the claims.

What is claimed is:
1. A glass substrate comprising:
   a first surface with surface features having an average width, an average height, and a ratio of the average height to the average width of from 0.033 to 0.072.
2. The glass substrate of claim 1,
   the glass substrate being transparent to electromagnetic radiation the visible spectrum.
3. The glass substrate of claim 1 having a composition of:
   at least 60 mol. % $SiO_2$, wherein the mol. % ratio $(Al_2O_3+B_2O_3)/\Sigma$modifiers (i.e., sum of modifiers) is greater than 1, and the modifiers are alkali metal oxides.
4. The glass substrate of claim 1 having a composition of:
   61-75 mol. % $SiO_2$;
   7-15 mol. % $Al_2O_3$;
   0-12 mol. % $B_2O_3$;
   9-21 mol. % $Na_2O$;
   0-4 mol. % $K_2O$;
   0-7 mol. % MgO; and
   0-3 mol. % CaO.

5. The glass substrate of claim 1,
the first surface having an average surface roughness Ra of from 10 nm to 1,000 nm.

6. The glass substrate of claim 1,
the first surface having an average characteristic largest feature size of from 200 nm to 50 µm.

7. The glass substrate of claim 1,
the first surface having a haze value from 3% to 15%.

8. The glass substrate of claim 1 further comprising:
a layer, contiguous with the first surface, that is under compressive stress.

9. The glass substrate of claim 1, wherein
the surface features comprise approximately partial spherical or ellipsoid voids;
the surface features further comprise adjacent peaks, a valley between the adjacent peaks, a height defined as the distance between a peak and the adjacent valley, and a width defined as the distance from a peak to an adjacent peak; and
the ratio of the average height to the average width of the surface features is twice an Ra value of surface roughness of the first surface divided by an average characteristic largest feature size of the surface features.

10. The glass substrate of claim 1, wherein the first surface exhibits a haze value within a range of from 3% to 40%.

11. The glass substrate of claim 1, wherein the ratio is within a range of from 0.065 to 0.072.

12. The glass substrate of claim 1, wherein the ratio is within a range of from 0.0377 to 0.065.

13. A glass substrate comprising:
a first surface with surface features having an average width, an average height, and a ratio of the average height to the average width of about 0.065, wherein,
the first surface exhibits a haze value of 3% to 40%.

14. The glass substrate of claim 13,
the glass substrate being transparent to electromagnetic radiation in the visible spectrum.

15. The glass substrate of claim 13 having a composition of:

61-75 mol. % $SiO_2$;
7-15 mol. % $Al_2O_3$;
0-12 mol. % $B_2O_3$;
9-21 mol. % $Na_2O$;
0-4 mol. % $K_2O$;
0-7 mol. % MgO; and
0-3 mol. % CaO.

16. The glass substrate of claim 13,
the first surface having an average surface roughness Ra of from 10 nm to 1,000 nm.

17. The glass substrate of claim 13 further comprising:
a layer, contiguous with the first surface, that is under compressive stress.

18. The glass substrate of claim 13, wherein
each of the surface features is approximately partial spherical or ellipsoid voids.

19. The glass substrate of claim 13, wherein
each of the surface features has adjacent peaks, a valley between the adjacent peaks, a height defined as the distance between a peak and the adjacent valley-, and a width defined as the distance from a peak to an adjacent peak; and
the ratio of the average height to the average width of the surface features is twice an Ra value of surface roughness of the first surface divided by an average characteristic largest feature size of the surface features.

20. A glass substrate comprising:
a first surface with surface features having a surface roughness ($R_a$) and an average characteristic largest feature size (ALF), wherein $2R_a/ALF$ is within a range of from 0.033 to 0.072.

21. The glass substrate of claim 20, wherein the first surface exhibits a haze value within a range of from 3% to 40%.

22. The glass substrate of claim 20, wherein $2R_a/ALF$ is within a range of from 0.065 to 0.072.

23. The glass substrate of claim 20, wherein $2R_a/ALF$ is within a range of from 0.0377 to 0.065.

* * * * *

UNITED STATES PATENT AND TRADEMARK OFFICE
CERTIFICATE OF CORRECTION

PATENT NO. : 11,926,556 B2  
APPLICATION NO. : 16/843377  
DATED : March 12, 2024  
INVENTOR(S) : Jaymin Amin et al.

Page 1 of 1

It is certified that error appears in the above-identified patent and that said Letters Patent is hereby corrected as shown below:

In the Claims

In Column 14, Line 54, in Claim 2, delete "radiation" and insert -- radiation in --.

In Column 16, Line 20, in Claim 19, delete "valley-," and insert -- valley, --.

Signed and Sealed this  
Third Day of February, 2026

John A. Squires  
*Director of the United States Patent and Trademark Office*